US005419947A

United States Patent [19]

Dejima et al.

[11] Patent Number: 5,419,947

[45] Date of Patent: May 30, 1995

[54] NON-RECIPROCAL CIRCUIT ELEMENTS

[75] Inventors: Hiroki Dejima; Takahiro Joudo; Keiji Okamura; Takashi Kawanami; Takashi Hasegawa; Katsuyuki Ohara, all of Nagaokakyo, Japan

[73] Assignee: Murata Mfg. Co. Inc., Nagaokakyo, Japan

[21] Appl. No.: 49,513

[22] Filed: Apr. 19, 1993

[30] Foreign Application Priority Data

Apr. 17, 1992 [JP] Japan ..................... 4-125630
Apr. 25, 1992 [JP] Japan ..................... 4-131613

[51] Int. Cl.[6] ..................... B32B 9/00

[52] U.S. Cl. ..................... 428/209; 428/210; 428/901; 333/1.1

[58] Field of Search ..................... 428/210, 901, 209; 333/1.1

[56] References Cited

U.S. PATENT DOCUMENTS

| | | | |
|---|---|---|---|
| 3,789,324 | 1/1974 | Iwase et al. | 333/1.1 |
| 4,812,787 | 3/1989 | Kuramoto et al. | 333/1.1 |
| 5,068,629 | 11/1991 | Nishikawa et al. | 333/1.1 |

OTHER PUBLICATIONS

WPI Abstract Accession No. 93-072887/09, JP 050022003 A, Jan. 29, 1993, Abstract.

WPI Abstract Accession No. 93-015288/02, JP 040345201 A, Dec. 1, 1992, Abstract.

*Primary Examiner*—Patrick J. Ryan
*Assistant Examiner*—Kam F. Lee
*Attorney, Agent, or Firm*—Ostrolenk, Faber, Gerb & Soffen

[57] ABSTRACT

Non-reciprocal circuit elements, wherein a plurality of ceramic green sheets having given electrode films with pattern shapes formed respectively on them are collectively fired and integrated into one dielectric basic plate after they have been adhered under pressure by lamination. A plurality of electrode films with pattern shapes are laminated within one dielectric basic plate, so that the internal circuit which includes the central electrode, the matching circuit and so on are disposed with microwave, with the result that they can be smaller in size, higher in performance and easier to manufacture.

6 Claims, 39 Drawing Sheets

NON-RECIPROCAL CIRCUIT ELEMENTS

BACKGROUND OF THE INVENTION

The present invention generally relates to non-reciprocal circuit elements and a method of manufacturing them, and more particularly, the improved construction of non-reciprocal circuit elements to be adopted as high-frequency parts for use in a microwave band such as isolators, circulators, and a method of manufacturing them.

Generally, non-reciprocal circuit elements such as isolators, circulators or the like have such a function that the attenuation is hardly effected in the transmission direction of signals, and the attenuation becomes larger in an opposite direction to the transmission direction. The non-reciprocal circuit elements are adopted in a transmission circuit portion of a mobile transmission appliance such as a portable telephone, automobile telephone or the like to be used in, for example, a UHF band. Non-reciprocal circuit elements to be adopted in the mobile communication appliance are demanded to be smaller in size and lighter in weight, considering the uses thereof. Conventionally, methods of intensively disposing central electrodes and matching circuits on one basic plate are variably proposed. The construction of such a non-reciprocal circuit element will be described hereinafter.

(1) First Prior Art

FIG. 56 and FIG. 57 are views showing the construction in a first example (hereinafter referred to as a first prior art) of the conventional circulator. Especially, FIG. 56 is a perspective view of the essential portions thereof, and FIG. 57 is a sectional view thereof. Three sets of central electrodes 2*a*, 2*b* are disposed at given angle intervals so that they may not come into contact against one another, and may not cross with respect to one another, as shown in FIG. 56, on the surface of the dielectric basic plate 1 of ceramic or the like. Three sets of central electrodes 2*c*, 2*d* are disposed at given angle intervals, so that they may not come into contact against one another, and may not cross with respect to one another similarly, on the reverse face of the dielectric basic plate 1 of ceramic. The respective central electrodes 2*a*, 2*b* are respectively connected with the respective central electrodes 2*c*, 2*d* of the reverse face through a plurality of through holes 5. Three capacity electrodes 3 are formed integrally with the central electrodes 2*a*, 2*b* around the respective central electrodes 2*a*, 2*b* on the surface of the dielectric basic plate 1. An earthing electrode 4 is formed integrally with the central electrodes 2*c*, 2*d* around the respective central electrodes 2*c*, 2*d* on the reverse face of the dielectric basic plate 1. The respective capacity electrodes 3 are opposed to the earthing electrode 4 with the dielectric basic plate 1 between them so as to constitute a capacitor for matching circuit use.

As shown in FIG. 57, the dielectric basic plate 1 is accommodated into the interior of a metallic yoke 7. An earth plate 8 is disposed below the dielectric basic plate 1 in contact with the earth electrode 4 on the reverse face of the dielectric basic plate 1. A concave portion is provided in the central portion of the earth plate 8 with a ferrite plate 6 being engaged into the concave portion. The ferrite plate 6 is positioned below the respective central electrodes so as to help the inductive coupling of the respective central electrodes. A magnet 9 is fixed onto the inner ceiling face of the yoke 7. The magnet 9 applies a direct current magnetic field with respect to each of the central electrodes.

(2) Second Prior Art

FIG. 58 and FIG. 59 show the construction of a second example (hereinafter referred to as a second prior art) of the conventional circulator. Especially, FIG. 58 is a perspective view of the essential portions thereof, and FIG. 59 is a sectional view thereof. An earth electrode 4 is formed as shown in FIG. 58 on the reverse face of a dielectric basic plate 1 such as ceramic or the like. Three electrode films having predetermined shapes, referred to herein as "pattern shapes 10" and two insulating sheets 11 are alternately formed by the repetition of printing and co-firing operations and are thereby sintered on the surface of the dielectric basic plate 1. Each of the electrode films of pattern shapes 10 has a central electrode portion 20 and a capacity electrode portion 30. One end of each of the central central electrodes 20 is connected with the earth electrode 4 on the reverse face respectively through a through hole 5. Each of the capacity electrode potions 30 is opposite to the earth electrode 4 with the dielectric basic plate 1 being therebetween so as to constitute a capacitor for matching circuit use.

The sectional construction of the second prior art is similar to the sectional construction of the above described first prior art as shown in FIG. 59.

(3) Third Prior Art

FIG. 60 and FIG. 61 are views showing the construction of a third example (hereinafter referred to as a third prior art) of the conventional circulator. Especially, FIG. 60 is a perspective view of the essential portions thereof, and FIG. 61 is a sectional view thereof. Electrode films of pattern shapes 10*a*, 10*b* and 10*c* are respectively formed by the printing operation on the surfaces of the dielectric basic plates 1*a*, 1*b* and 1*c* of a ceramic or the like. The earth electrodes 4*a*, 4*b* and 4*c* are respectively formed by the printing operation on the reverse face of the dielectric basic plates 1*a*, 1*b* and 1*c*. The electrode films of pattern shapes 10*a*, 10*b* and 10*c* respectively include central electrode portions 20*a*, 20*b* and 20*c*, capacity electrode portions 30*a*, 30*b* and 30*c*, and earth electrode portions 40*a*, 40*b* and 40*c*. The dielectric electrode basic plates 1*a*, 1*b* and 1*c* are individually fired, and thereafter are adhered under pressure to form a multi-layer basic plate. The earth electrode portions 40*a*, 40*b*, 40*c*, and earth electrodes 4*a*, 4*b*, 4*c* are connected with respect to one another through through holes 5. Each of the capacity electrode portions 30*a*, 30*b* and 30*c* are respectively opposite to the earth electrodes 4*a*, 4*b* and 4*c* with the dielectric basic plates 1*a*, 1*b* and 1*c* being therebetween so as to constitute a capacitor for matching circuit use.

The sectional construction of the third prior art is somewhat similar to the sectional construction of the above described first prior art as shown in FIG. 61.

The first through third prior arts described hereinabove have various problems as described hereinafter.

(1) First Prior Art Problem a. Through holes are required without fail to permit crossing of the central electrodes without the respective central electrodes being short-circuited with respect to one another, thus resulting in complicated construction and higher cost.

b. Width of the central electrode has to be made narrower in order to prevent short-circuiting among the central electrodes. Therefore, the loss at the central electrode increases, thus resulting in deteriorated electric characteristics.

c. The capacity electrodes 3 are disposed around the respective central electrodes 2*a*, 2*b*. Area of the capacity electrodes 3 has to be made larger in order to obtain necessary capacity values so that the construction of the whole element is made larger in size.

d. Two co-firing steps are required, namely, a co-firing step to sinter a dielectric basic plate 1, and a co-firing step to sinter an electrode printed on the dielectric basic plate 1, thus resulting in complicated manufacturing and longer manufacturing time.

e. A wiring operation is required between the dielectric basic plate and the circuit basic plate in the mounting operation on the external circuit basic plate, thus resulting in complicated and troublesome mounting operation.

(2) Second Prior Art Problem a. Capacity electrode portions 30 are disposed around the respective central electrode portions 20. Area of the capacity electrode portions 30 has to be made larger so as to obtain the necessary capacity value, thus resulting in larger size of the whole element.

b. The co-firing steps to sinter the respective electrode films of pattern shapes 10 and the respective insulating sheets 11 are repetitively required, thus resulting in complicated manufacturing and longer manufacturing time.

c. A wiring operation is required between the dielectric basic plate and the circuit basic plate in the mounting operation on the external circuit basic plate, thus resulting in complicated and troublesome mounting operation.

(3) Third Prior Art Problem a. The capacity electrodes 30*a* through 30*c* are disposed around the respective central electrodes 20*a* through 20*c*. Area of the capacity electrodes 30*a* through 30*c* has to be made larger in order to obtain the necessary capacity value so that the construction of the whole element is made larger in size.

b. The co-firing steps to sinter each of the respective dielectric basic plates 1*a* though 1*c* are repetitively required, thus resulting in complicated manufacturing and longer manufacturing time.

c. Connecting locations are increased in number so that reliability is inferior.

d. It is difficult to make thinner each of the dielectric basic plates 1*a* through 1*c*. Therefore, the thickness of the whole element becomes larger and the intervals between the central electrodes located on the lower layer and the upper layer become too far, which unbalances the mutual couplings because the equivalent circuit constants of the central electrodes are unequal.

e. A wiring operation is required between the dielectric basic plate and the circuit basic plate in the mounting operation of the non-reciprocal circuit element on the external circuit basic plate, thus resulting in a complicated and troublesome mounting operation.

SUMMARY OF THE INVENTION

Accordingly, the present invention has been developed with a view to substantially eliminating the above discussed problems that exist with the above described first through third prior arts, and has for its essential object to provide improved non-reciprocal circuit elements.

Another important object of the present invention is to provide improved non-reciprocal circuit elements which are smaller in size, lower in price, higher in reliability and easier to manufacture, and a method of manufacturing them.

In accomplishing these and other objects, according to one preferred embodiment of the present invention, there is provided a non-reciprocal circuit element which is extremely small in attenuation degree in the transmission direction of the signal, and extremely larger in attenuation degree in a direction opposite to it. A plurality of electrode films of pattern shapes are disposed in lamination within one dielectric basic plate, so that internal circuits are arranged in three dimensions.

In such construction, the smaller size and higher performance of the whole element are designed by the laminating disposition of a plurality of electrode films of pattern shapes within one dielectric basic plate. Namely, as the internal circuit disposed conventionally on the same level can be disposed in three dimensions within the dielectric basic plate, the circuit area of the whole element can be made smaller. As the respective electrode films of pattern shapes can be crossed without mutual contact within the interior of the dielectric basic plate, the insertion loss can be reduced without requirement of the narrower central electrode width as in the first prior art. As the construction is integral, sufficiently larger strength can be retained even if the arrangement is made with the intervals among the respective electrode films of pattern shapes being extremely close. As a result, the electric symmetrical of the coupling property among the respective central electrodes can be maintained in better balance with the circuit constants of the electrical equivalent circuit of the three control electrodes remaining substantially equal.

The present invention is characterized in that the electrode pattern includes one central electrode pattern or more, and one capacitor electrode pattern or more, one earth electrode pattern or more, and in the interior of the dielectric basic plate, the capacitor electrode films of pattern shapes and the earth electrode films of pattern shapes are alternately disposed with dielectrics between them, the respective capacitor electrode films of pattern shapes are connected in common and connected with the corresponding central electrode films of pattern shapes, and the respective earth electrode films of pattern shapes are connected in common, so that one matching circuit capacity or more are disposed in lamination between the central electrode films of pattern shapes and the earth electrode films of pattern shapes.

In such construction, the capacitor electrode films of pattern shapes and the earth electrode films of pattern shapes are alternately disposed with dielectrics being inserted therebetween, the respective capacitor electrode films of pattern shapes are connected in common and are connected with the corresponding central electrodes films of pattern shapes, and further, one matching circuit capacitor or more are disposed in lamination between the central electrode films of pattern shapes and the earth electrode films of pattern shapes by the common connection between the respective earth electrode films of pattern shapes. A capacity value necessary for the matching circuit can be obtained with smaller circuit area so that the smaller size of the whole element can be designed.

The present invention also relates to a non-reciprocal circuit element which is extremely small in attenuation degree in the transmission direction of the signals and extremely large in attenuation degree in a direction opposite to it. The non-reciprocal circuit element comprises one dielectric basic plate formed by the integration of a plurality of fired dielectric green sheets adhered under pressure by lamination, a plurality of electrode films of pattern shapes formed by co-firing them with the dielectric green sheets and disposed by lamination within the dielectric basic plate, a plurality of external connecting terminals formed by co-firing them with the dielectric green sheet, and connected with the given electrode films of pattern shapes and disposed so as to be exposed on the outer periphery of the dielectric basic plate, whereby the internal circuit and the external connecting terminals which are connected with it become integral with the dielectric basic plate and arranged in three dimensions.

In such construction, a plurality of external connecting terminals connected with a plurality of electrode films of pattern shapes disposed in lamination and a plurality of external connecting terminals connected with the given electrode films of pattern shapes are fired simultaneously with a plurality of dielectric green sheets pressed under pressure in lamination and are integrated with one dielectric basic plate so as to obtain a non-reciprocal circuit element having smaller size of the elements, lower cost, higher reliability and simplified assembling steps. As not only the electrode films of pattern shapes, but the external connecting terminals are also integrated on one dielectric basic plate, the number of the parts can be considerably reduced and the smaller size of the element can be obtained. As the number of assembling steps is reduced, the cost can be lowered. As the connecting locations with the soldering operations can be considerably reduced, the reliability can be improved. As the internal circuit conventionally disposed in a plane can be disposed in three dimensions within the dielectric basic plate, the circuit area of the whole element can be reduced. As the respective electrode films of pattern shapes can be crossed without contacting each other within the dielectric basic plate, the insertion loss can be reduced without requiring narrower width of the central electrodes as in the first conventional art. As the construction is integral, sufficiently larger strength can be obtained even if the arrangement is made with the intervals among the respective electrode films of pattern shapes being extremely close. As a result, the electric symmetry of the equivalent circuit properties among the respective central electrodes can be maintained in better balance. As the dielectric basic plate, the respective electrode films of pattern shapes, and the respective external connecting terminals are formed at the same time in one co-firing step to be sintered, the manufacturing time can be considerably shortened.

The present invention is further characterized in that a dielectric basic plate has one main surface and another main surface. A first concave portion for engaging a magnet for applying a direct current magnetic field is formed on the one side main surface.

In such construction, a more compact non-reciprocal circuit element is provided by the formation of a first concave portion for engaging a magnet for applying a direct current magnetic field on one main surface of the dielectric basic plate.

A second concave portion for engaging a ferrite plate for inductive coupling of the inner circuit is formed in the other main surface.

In such construction, a second concave portion for engagement of the ferrite plate for inductive coupling of the internal circuit is formed in the other main surface of the dielectric basic plate so that a non-reciprocal circuit element which is more compact and lower in price can be obtained.

The present invention also relates to a method of manufacturing non-reciprocal circuit elements which are extremely smaller in attenuation degree in the transmitting direction of the signal and extremely larger in attenuation degree in a direction opposite to it. This method comprises a laminating step of adhering under pressure in lamination a plurality of dielectric green sheets with given-electrode films of pattern shapes being formed respectively on them so as to obtain laminated green sheet bodies, a co-firing step for sintering the green sheet laminated bodies so as to integrate them to form one dielectric basic plate. A non-reciprocal circuit element is obtained in three inner circuits being disposed in lamination with dimensions within one dielectric basic plate.

In such construction, a plurality of dielectric green sheets with given electrode films of pattern shapes being formed on each of them are fired collectively after being adhered under pressure in lamination so as to be integrated in one dielectric basic plate. As the dielectric basic plate and the internal circuit are simultaneously formed by one co-firing step to be sintered, the manufacturing time can be considerably reduced.

The present invention is also characterized in that the central electrodes and the dielectric basic plates are sintered at the same time by one co-firing step to be sintered.

The present invention is also characterized in that the central electrode, a matching circuit to be connected with it, and a dielectric basic plate are sintered at the same time by one co-firing step.

BRIEF DESCRIPTION OF THE DRAWINGS

These and other objects and features of the present invention will become apparent from the following description of embodiments thereof with reference to the accompanying drawings, in which.

DETAILED DESCRIPTION OF EMBODIMENTS OF THE INVENTION

Figure 1:
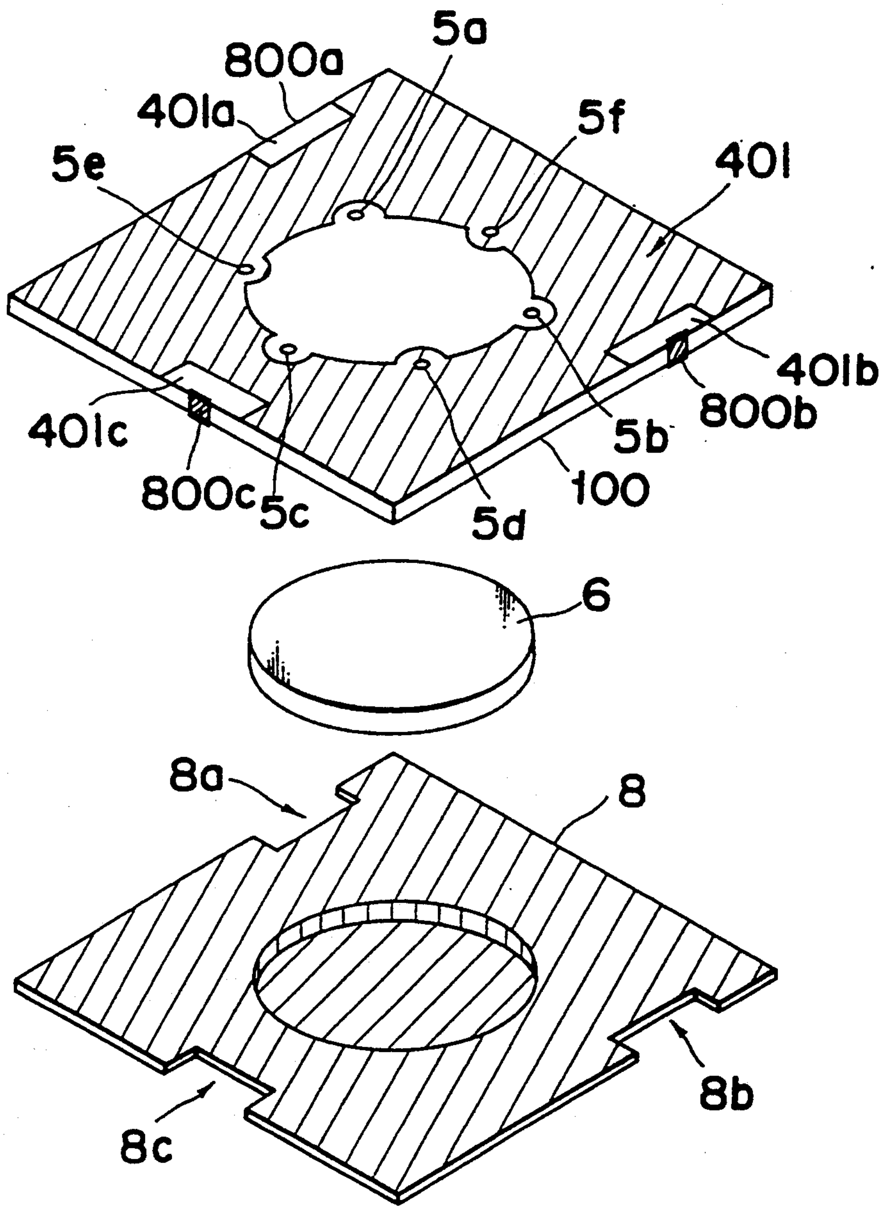
FIG. 1 is a perspective view of the essential portions of a circulator in accordance with a first embodiment of the present invention.

Before the description of the present invention proceeds, it is to be noted that like parts are designated by like reference numerals throughout the accompanying drawings.

(First Embodiment)

Figure 2:
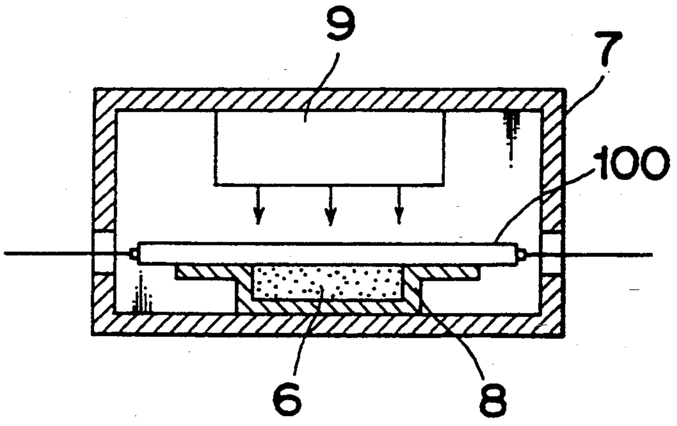
FIG. 2 is a sectional view of a circulator in accordance with the first embodiment of the present invention.
Figure 3:
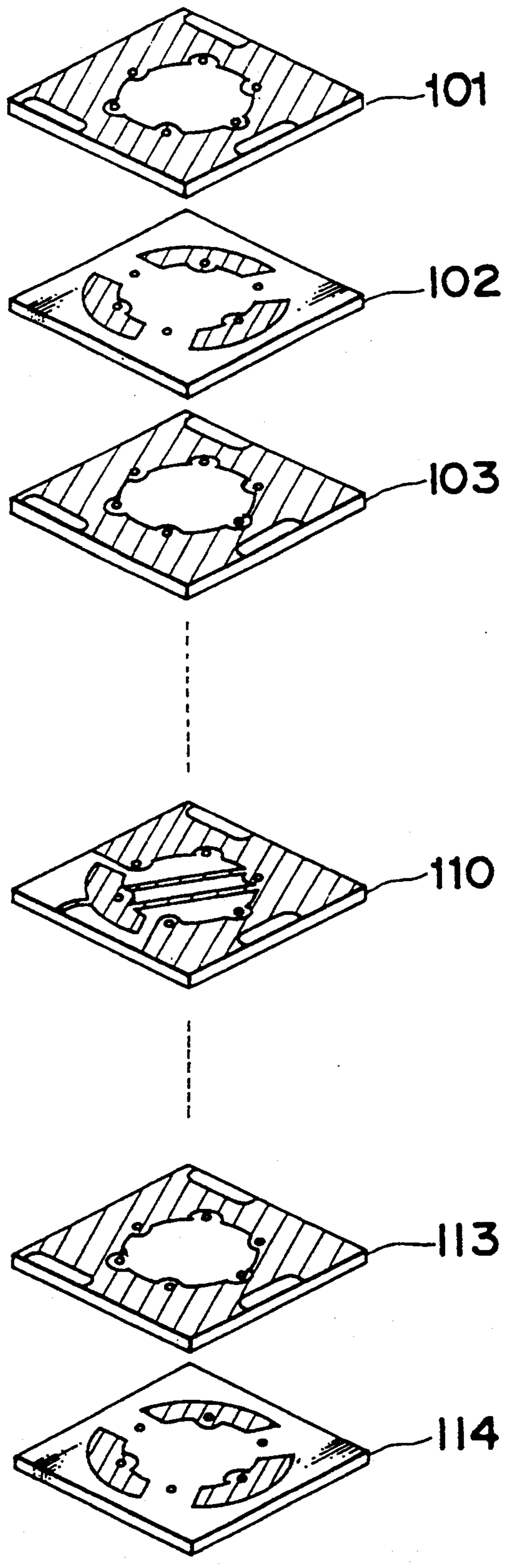
FIG. 3 shows the manufacturing of a dielectric basic plate to be used in the first embodiment of the present invention, showing the condition of a ceramic green sheet before the lamination and co-firing operations.

FIG. 1 through FIG. 18 are views showing the construction of a circulator in accordance with a first embodiment of the present invention. FIG. 1 is a perspective view of the essential portions of a circulator. FIG. 2 is a sectional view of a circulator. FIG. 3 is a perspective view for illustrating a manufacturing step of a dielectric basic plate. FIG. 4 through FIG. 18 are plan views showing an electrode pattern in each ceramic green sheet. One embodiment of the present invention will be described hereinafter with reference to these FIG. 1 through FIG. 18.

As shown in FIG. 1 and FIG. 2, a dielectric basic plate 100 is accommodated in the interior of a metallic yoke 7. An earth plate 8 is disposed under the dielectric basic plate 100, with the earth plate 8 being in contact against the earth electrode 4 on the reverse face of the dielectric basic plate 100. A concave portion is provided in the central portion of the earth plate 8, with a ferrite plate 6 being engaged into the concave portion. The ferrite plate 6 is positioned below each central electrode so as to help the inductive coupling of each central electrode. A magnet 9 is secured to the internal ceiling face of the yoke 7. The magnet 9 applies a direct current magnetic field with respect to each central electrode.

The above described dielectric basic plate 100 is collectively fired and composed as shown in FIG. 3 after a plurality of ceramic green sheets 101 through 114 with given electrode films of pattern shapes being formed respectively on them are laminated, and adhered under pressure. The ceramic green sheets are thin (normally of several 10μ or so) sheet shaped members having flexibility which are obtained by, for example, an extrusion molding with ceramic powder unfired or temporarily fired being mixed, and kneaded with an organic solvent which is a binder. A material having high Q in the high frequency region and high $\epsilon\tau$ (for example, $\epsilon\tau=20$ through 100), for example, dielectric material of $MgTiO_3$—$CiTiO_3$ series, $ZrO_2$—$SnO_2$—$TiO_2$ series, $BaTi_4O_9$ series, or $Nd_2Ti_2O_7$—(BaPb $TiO_3$—$TiO_2$ series is used as a ceramic green sheet material. The formation of the respective electrode pattern is formed by, for example, printing, evaporating operations and so on, with materials such as Pd, Pt and so on being selected as a function of the sintering temperature of the dielectric material. The respective ceramic green sheets 101 through 114 are fused, and integrated by collective co-firing into one dielectric basic plate 100.

Figure 4:
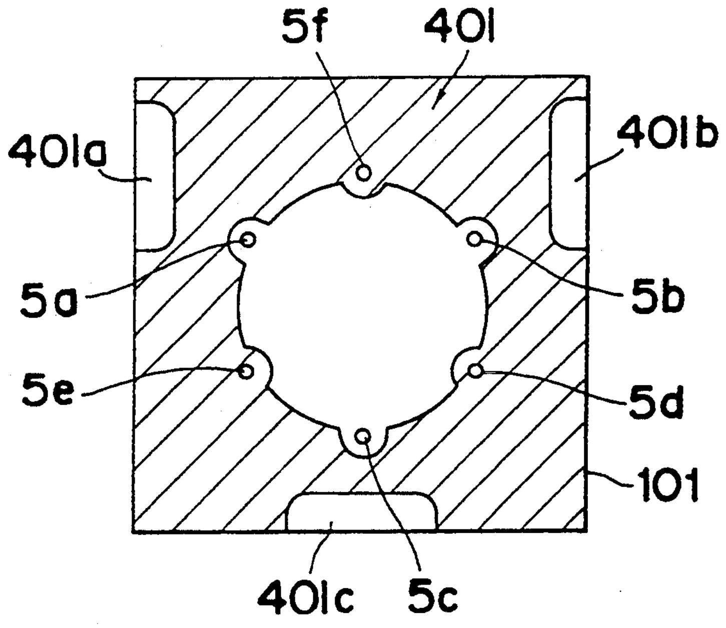
FIG. 4 is a top face view of a first ceramic green sheet.
Figure 5:
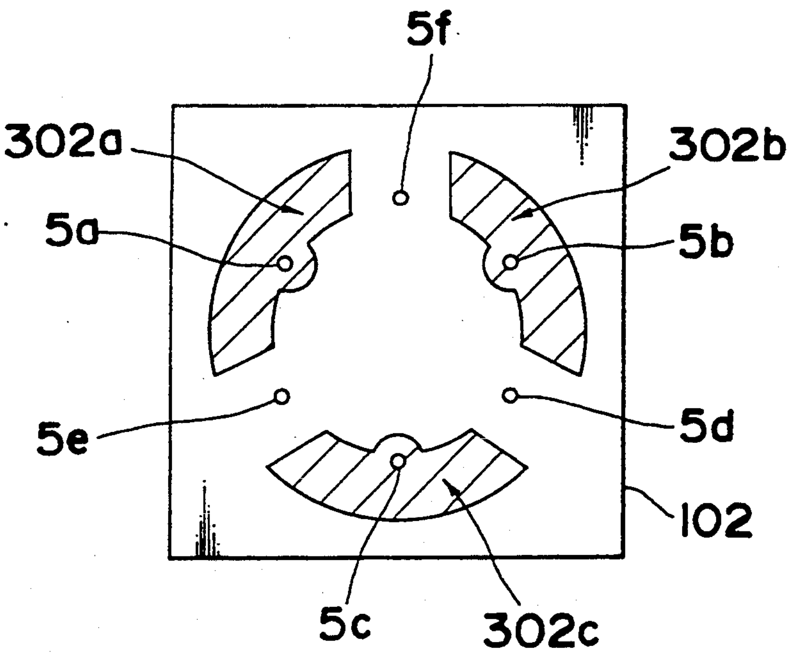
FIG. 5 is a top face view of a second ceramic green sheet.
Figure 6:
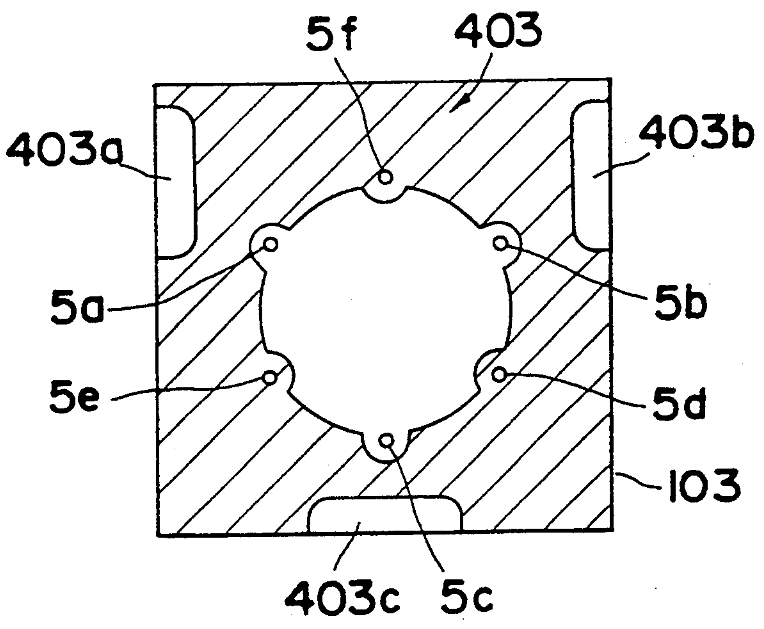
FIG. 6 is a top face view of a third ceramic green sheet.
Figure 7:
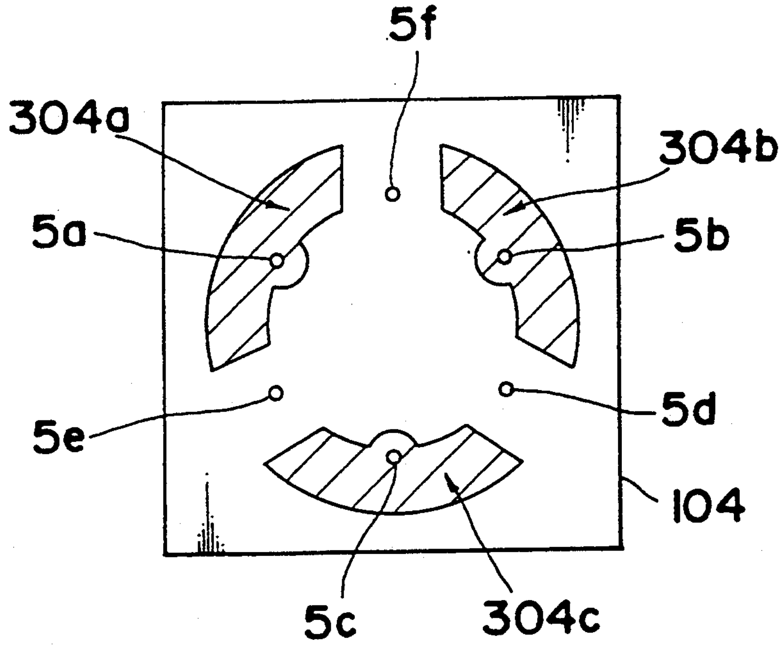
FIG. 7 is a top face view of a fourth ceramic green sheet.
Figure 8:
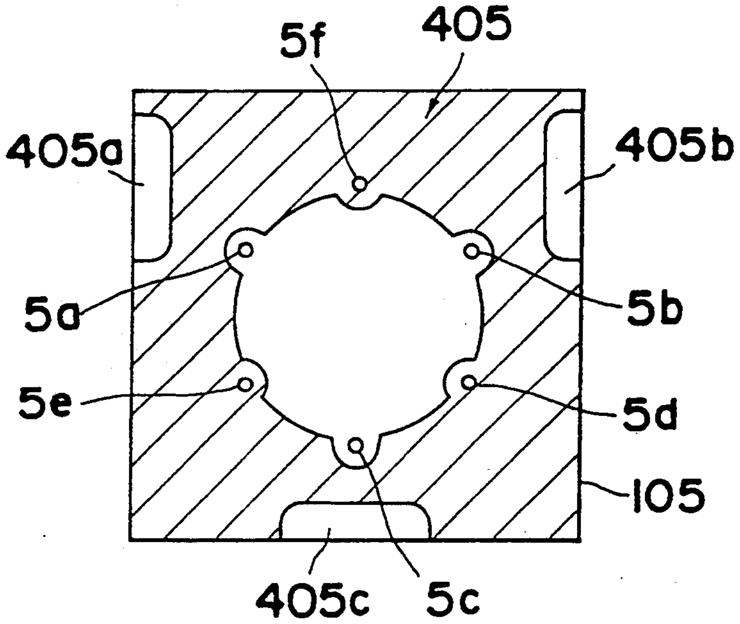
FIG. 8 is a top face view of a fifth ceramic green sheet.
Figure 9:
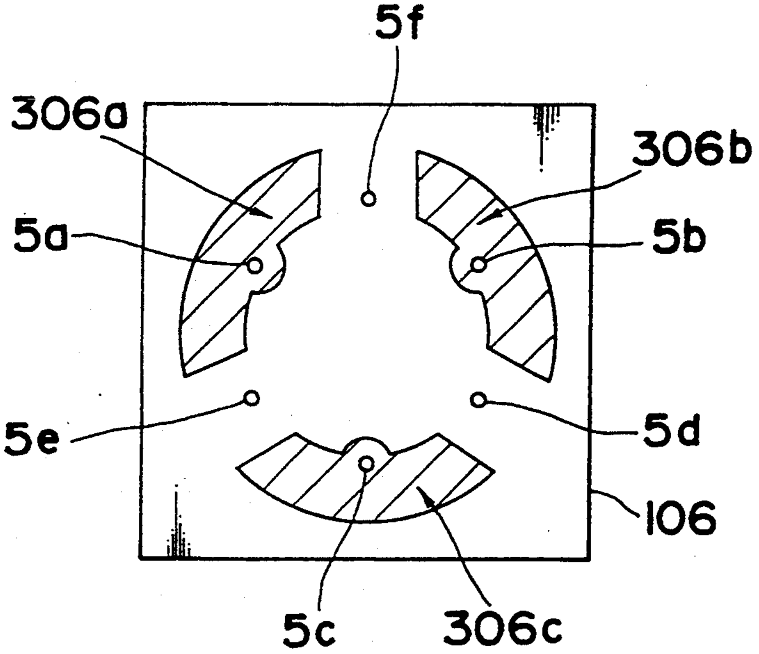
FIG. 9 is a top face view of a sixth ceramic green sheet.
Figure 10:
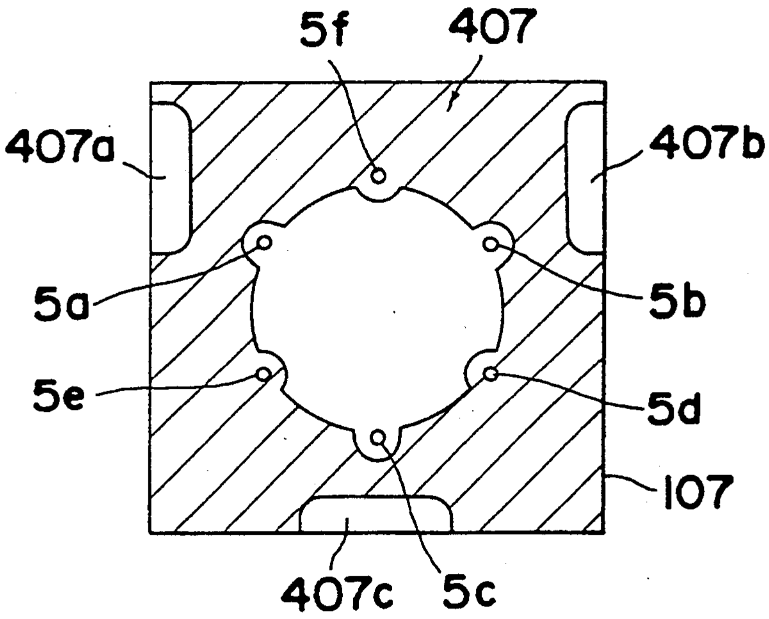
FIG. 10 is a top face view of a seventh ceramic green sheet.
Figure 11:
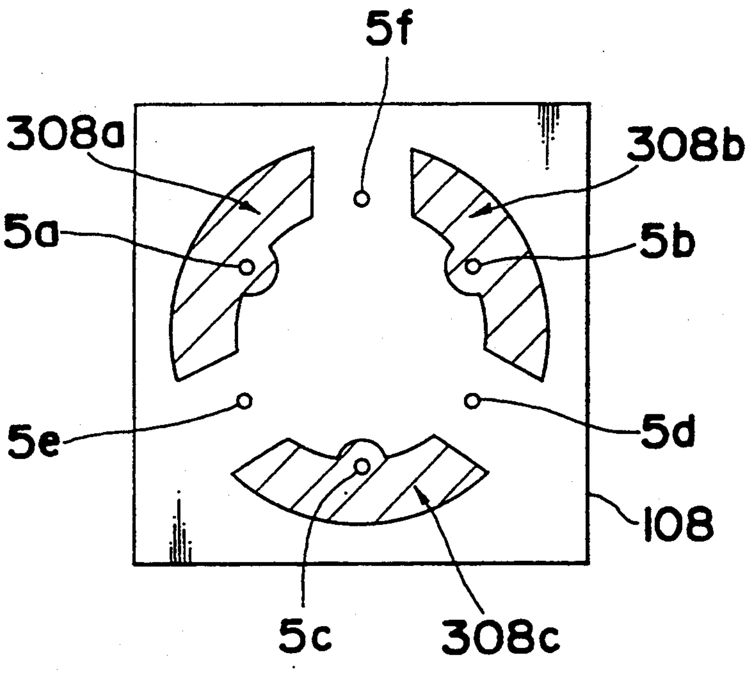
FIG. 11 is a top face view of an eighth ceramic green sheet.
Figure 12:
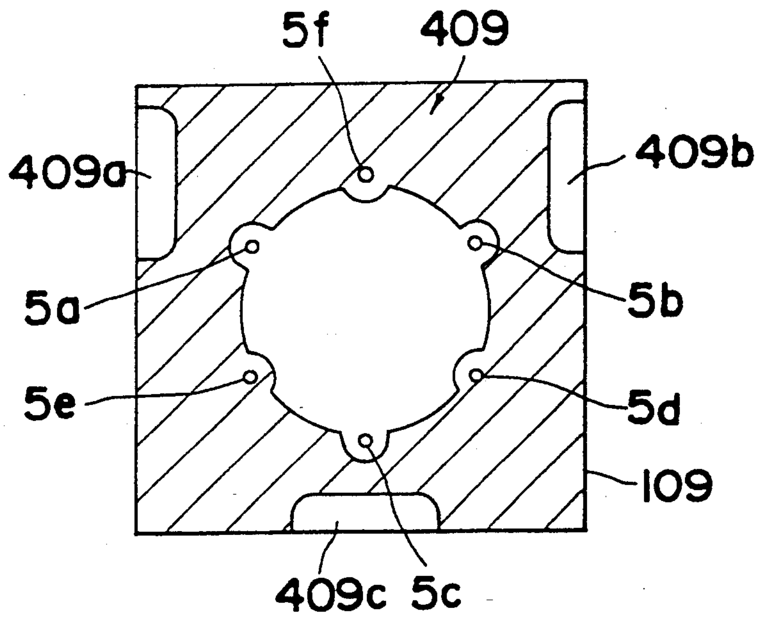
FIG. 12 is a top face view of a ninth ceramic green sheet.
Figure 16:
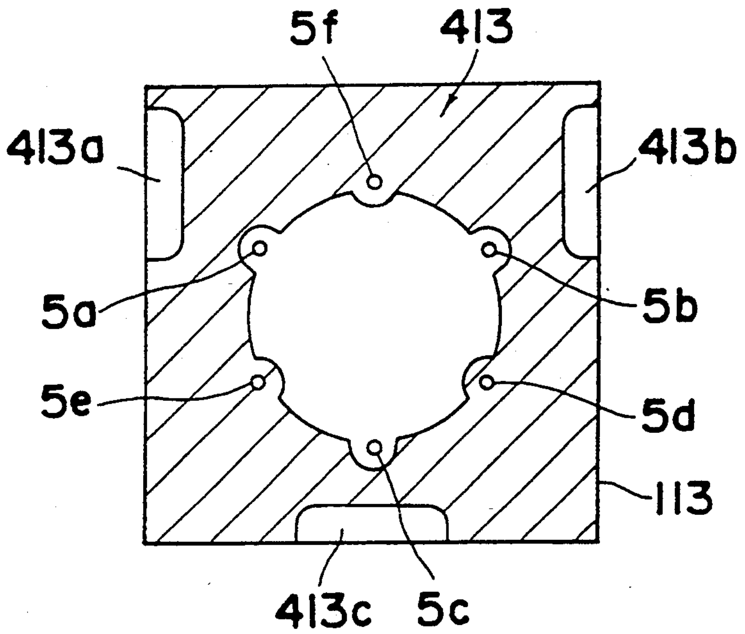
FIG. 16 is a top face view of a thirteenth ceramic green sheet.
Figure 17:
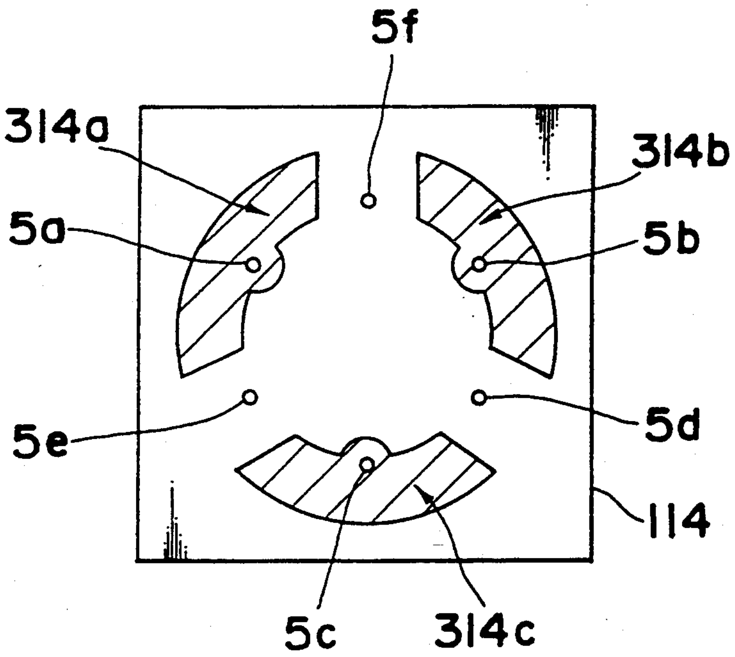
FIG. 17 is a top face view of a fourteenth ceramic green sheet.
Figure 18:
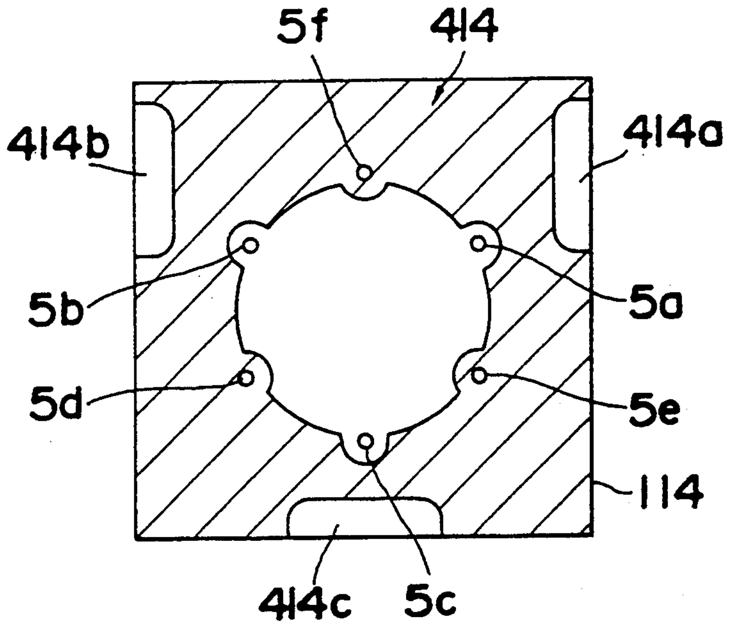
FIG. 18 is a bottom face view of the fourteenth ceramic green sheet.

As shown in FIG. 4, FIG. 6, FIG. 8. FIG. 10, FIG. 12, FIG. 16, earth electrode films of pattern shapes 401, 403, 405, 407, 409, 413 on the same form are formed respectively on the surfaces of the ceramic green sheets 101, 103, 105, 107, 109, 113. As shown in FIG. 18, an earth electrode pattern 414 on the same form as the respective earth electrode films of pattern shapes is formed on the reverse face of the ceramic green sheet 114. As shown in FIG. 5, FIG. 7, FIG. 9, FIG. 11, FIG. 17, capacity electrode films of pattern shapes **302*a* through 302*c*, 304*a* through 304*c*, 306*a* through 306*c*, 308*a* through 308*c*, 314*a* through 314*c* on the same form are formed respectively on the surfaces of ceramic green sheets 102, 104, 106, 108, 114**.

Electrode films of pattern shapes 710, 711, 712 on approximately the same form are formed respectively on the surfaces of the ceramic green sheets 110, 111,112. Respective electrode films of pattern shapes 710 through 712 are disposed each being shifted at an angular interval of 120° with respect to one another. The electrode pattern 710 includes a central electrode portion 210, a capacity electrode portion 310, an earth electrode portion 410, a wiring portion 810. The electrode pattern 711 includes a central electrode portion 211, a capacity electrode portion 311, an earth electrode portion 411, a wiring portion 811. An electrode pattern 712 includes a central electrode portion 212, a capacity electrode portion 312, an earth electrode portion 412, a wiring portion 812. Capacity electrode portions 310, 311, 312 are respectively connected with one end of the central electrode portions 210, 211, 212. Earth electrode portions 410, 411, 412 are respectively connected with the other end of the central electrodes 210, 211, 212. Capacity electrode portions 310, 311, 312 are respectively drawn out so far as the end portions of the ceramic green sheets 110, 111, 112 through the wiring portions 810, 811, 812.

Capacity electrode films of pattern shapes **302*a*, 304*a*, 306*a*, 308*a*, 314*a* and the capacity electrode portion 310 are connected with each other through a through hole 5*a*. Capacity electrode films of pattern shapes 302*b*, 304*b*, 306*b*, 308*b*, 314*b* and the capacity electrode portion 311 are connected with each other through a through hole 5*b*. The capacity electrode films of pattern shapes 302*c*, 304*c*, 306*c*, 308*c*, 314*c* and the capacity electrode 312 are connected with each other through a through hole 5*c*. The earth electrodes films of pattern shapes 401, 403, 405, 407, 409, 413, 414 and the earth electrode portions 410, 411, 412 are connected with each other through through holes 5*d*, 5*e*, 5*f***.

In such construction as described hereinabove, the capacity electrode pattern **302*a* forms a first capacitor by the opposition between the earth electrode films of pattern shapes 401 and 403. The capacity electrode pattern 304*a* forms a second capacitor by the opposition between the earth-electrode films of pattern shapes 403 and 405. The capacity electrode pattern 306*a* forms a third capacitor by the opposition between the earth electrode films of pattern shapes 405 and 407. The capacity electrode pattern 308*a* forms a fourth capacitor by the opposition between the earth electrode films of pattern shapes 407 and 409. Capacity electrode 310 forms a fifth capacitor by the opposition between the earth electrodes portions 409 and 411. The capacity electrode pattern 314*a* forms a sixth capacitor by the opposition between the earth electrode films of pattern shapes 413 and 414. The first through sixth capacitors constitute a matching circuit and are connected in parallel between one end of the central electrode portion 210 and the earth, and are inserted. This is because the respective one side electrodes 302*a*, 304*a*, 306*a*, 308*a*, 310, 314*a* of the first through sixth capacitors are connected with one end of the central electrode portion 210 in common through a through hole 5*a*. The respective other-way electrodes 401, 403, 405, 407, 409, 411, 412, 413, 414 of the first through sixth capacitors are commonly connected with the earth through through holes 5*d*, 5*e*, 5*f*. Thus, six capacitors form a matching circuit and are connected in parallel and inserted between the central electrode portion 211 and the earth, and six capacitors form a matching circuit and are connected in parallel and inserted between the central electrode portion 212** and the earth.

As a plurality of capacitors connected in parallel are laminated and disposed between the one end of the respective central electrode portions 210 through 212 and the earth as described hereinabove, the capacity value necessary as the matching circuit can be retained with small circuit area. Accordingly, the construction of the whole element can be made smaller in size. In the above described embodiment, the co-firing of the dielectric basic plate, the central electrode, the matching circuit can be completed by one co-firing step so that the manufacturing step is simplified, and the manufacturing time can be considerably reduced. As a plurality of ceramic green sheet are integrated on one dielectric basic plate 100 by the co-firing operation in the above described embodiment, the thickness of the respective ceramic green sheet, namely, the interval among the respective central electrode portions 210 through 212 can be extremely narrowed without strength problem. As a result, the electrical symmetry of the respective central electrode portions 210 through 212 can be made better.

As shown in FIG. 1, side face electrodes 800*a*, 800*b*, 800*c* are formed on the side face of the dielectric basic plate 100. The side face electrode 800*a* is connected with the wiring portion 810 of FIG. 13, the side face electrode 800*b* is connected with the wiring portion 811 of FIG. 14, the side face electrode 800*c* is connected with the wiring portion 812 of FIG. 15. In the respective ceramic green sheets, blank portions 401*a*, 403*a*, 405*a*, 407*a*, 409*a*, 411*a*, 412*a*, 413*a*, 414*a* are formed, on the earth electrode pattern or the earth electrode portion, so as to surround the periphery of the side face electrode 800*a*. Blank portions 401*b*, 403*b*, 405*b*, 407*b*, 409*b*, 410*b*, 412*b*, 413*b*, 414*b* are formed so as to surround the periphery of the side face electrode 800*b*. Blank portions 401*c*, 403*c*, 405*c*, 407*c*, 409*c*, 410*c*, 411*c*, 413*c*, 414*c* are formed so as to surround the periphery of the side face electrode 800*c*. A blank portion 8*a* is formed on the earth plate 8 so as to surround the periphery of the side face electrode 800*a*. A blank portion 8*b* is formed so as to surround the periphery of the side face electrode 800*b*. A blank portion 8*c* is formed so as to surround the periphery of the side face electrode 800*c*. This arrangement prevent short circuiting among the respective side face electrodes and the respective earth electrode films of pattern shapes, the respective earth electrode portions and the earth plate 8.

An operation of a circulator shown in FIG. 1 and FIG. 2 will be described hereinafter. When a high frequency signal is inputted into the side face electrode 800*a*, a high frequency magnetic field caused around the central electrode portion 210 is rotated by a given angle by the direct current magnetic field from the magnet 9 so as to cause an induced current in, for example, the right-hand adjacent central electrode portion 211 by the inductive coupling through the ferrite plate 6. The high frequency signal inputted from the side face electrode 800*a* is transmitted to the right-hand adjacent side face electrode 800*b*, but is not transmitted to the left-hand adjacent side face electrode 800*c*. A high frequency signal inputted from the side face electrode 800*b* is transmitted to the right-hand adjacent side face electrode 800*c*, but is not transmitted to the left-hand adjacent side face electrode 800*a*. A high frequency signal inputted from the side face electrode 800*c* is transmitted to the right-hand adjacent side face electrode 800*a*, but is not transmitted to the left-hand adjacent side face electrode 800*b*.

A circulator shown in FIG. 1 and FIG. 2 can be used as an isolator if a terminal resistor is connected between any one of the wiring portions or the side face electrodes (for example, a wiring portion 812 or a side face electrode 800*c*) and the earth. In this case, the isolator transmits a high frequency signal only in one direction from one of the remaining side face electrode (for example, a side face electrode 800*a*) to the other remaining side face electrode (for example, a side face electrode 800*b*).

(Second Embodiment)

Figure 19:
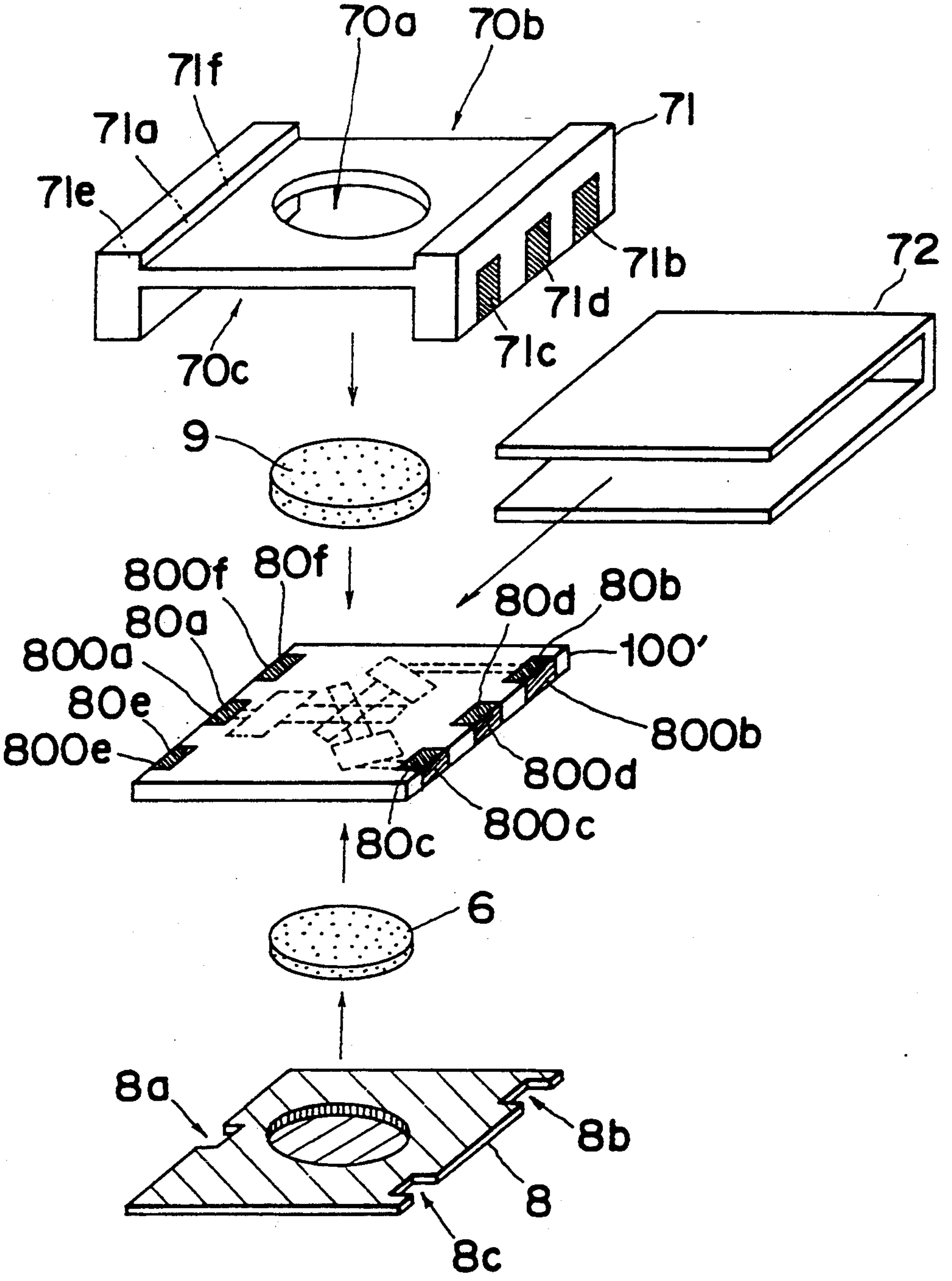
FIG. 19 is an exploded perspective view of a circulator in accordance with a second embodiment of the present invention.
Figure 20:
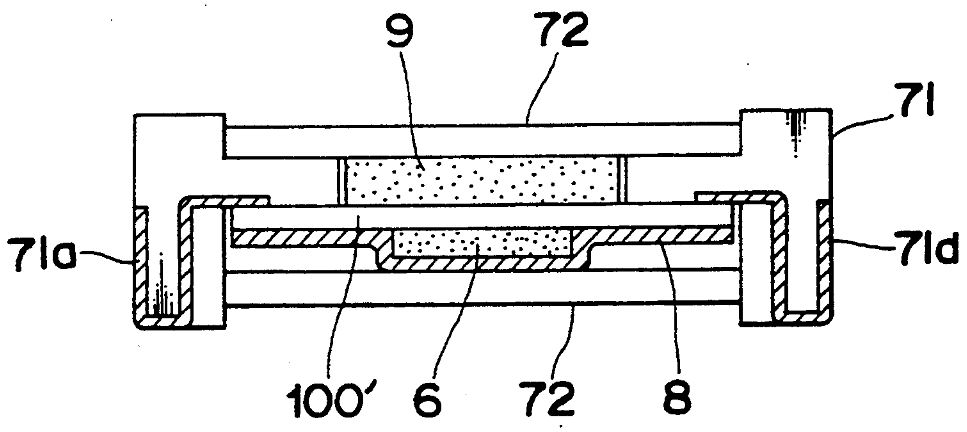
FIG. 20 is a sectional view of a circulator in accordance with the second embodiment of the present invention.

FIG. 19 and FIG. 20 shows views each showing the construction of a circulator in accordance with a second embodiment of the present invention. FIG. 19 is an exploded perspective view of a circulator and FIG. 20 is a sectional view of a circulator. The other embodiment of the present invention will be described hereinafter with reference to FIG. 19 and FIG. 20.

Figure 13:
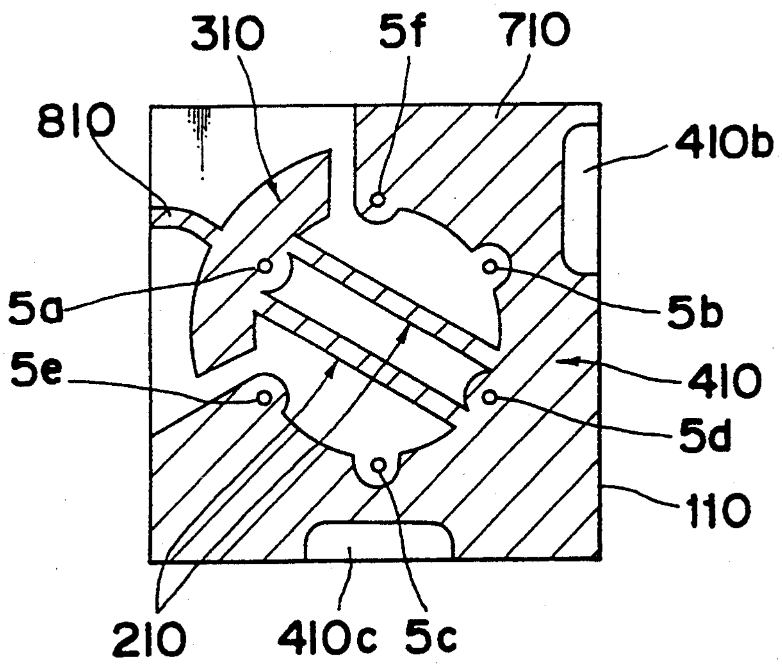
FIG. 13 is a top face view of a tenth ceramic green sheet.
Figure 14:
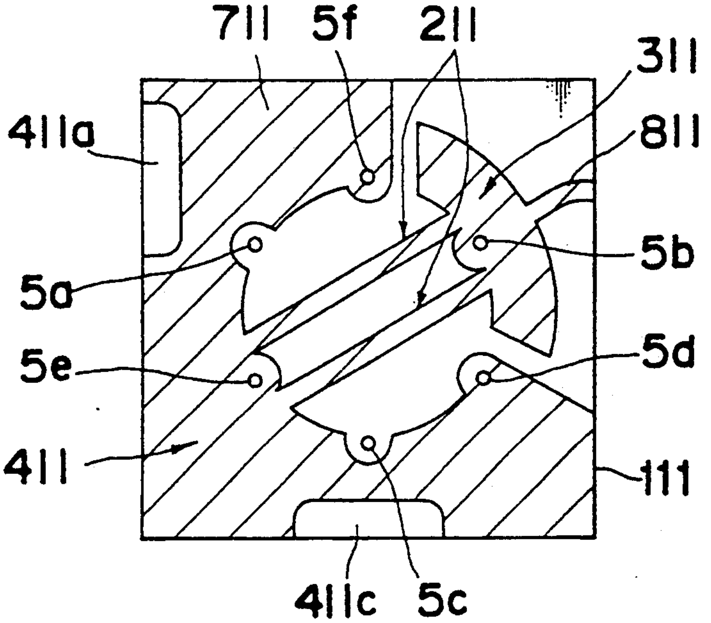
FIG. 14 is a top face view of an eleventh ceramic green sheet.
Figure 15:
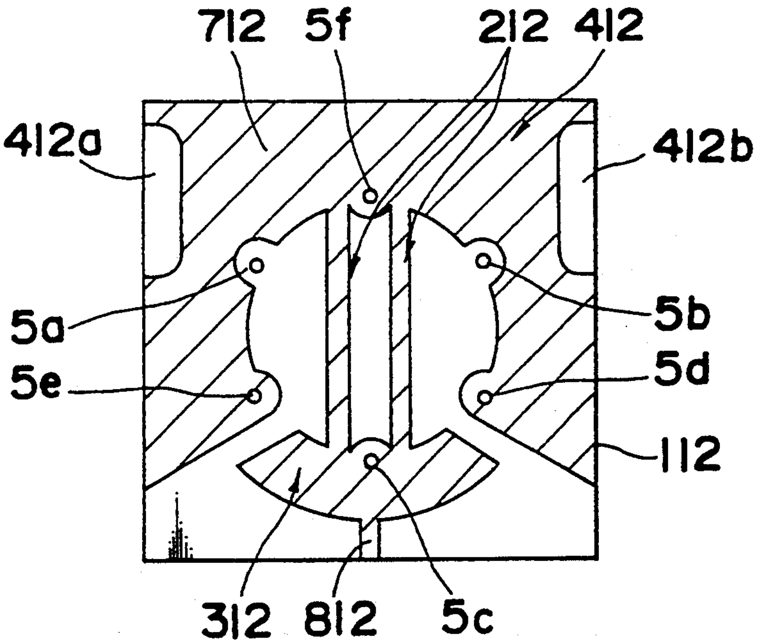
FIG. 15 is a top face view of a twelfth ceramic green sheet.

In the drawings, a dielectric basic plate 100′ is collectively fired, integrated after a plurality of ceramic green sheets with given electrode films of pattern shapes being formed respectively on them are adhered under pressure in lamination as in the dielectric basic plate 100 shown in FIG. 1. The connection among the respective capacity electrode films of pattern shapes and the respective capacity electrode portions in the dielectric basic plate 100′ are effected through the side face electrodes 800*a* through 800*c* without provision of the through holes. Capacity electrode films of pattern shapes 302*a*, 304*a*, 306*a*, 308*a*, 314*a* shown in FIG. 5, FIG. 7, FIG. 9, FIG. 11, FIG. 17 and the capacity electrode portion 310 shown in FIG. 13 are respectively provided with wiring portions, and are composed to be exposed on the side face corresponding to the side face electrode 800*a*. Similarly, the capacity electrode films of pattern shapes 302*b*, 304*b*, 306*b*, 308*b*, 314*b* and the capacity electrode portion 311 shown in FIG. 14 are provided respectively with the wiring portions, and are composed so as to be exposed on the side face corresponding to the side face electrode 800*b*. The capacity electrode films of pattern shapes 302*c*, 304*c*, 306*c*, 308*c*, 314*c* and the capacity electrode portion 312 shown in FIG. 15 are respectively provided with wiring portions, and are composed so as to be exposed on the side face corresponding to the side face electrode 800*c*. Blank portions are provided so as to surround the peripheries of the side face electrodes 800*a* through 800*c* on the earth electrode films of pattern shapes 401, 403, 405, 407, 409, 413, 414 and the earth electrode portions 410, 411, 412 on the dielectric basic plate 100′ so as to prevent short-circuiting among the respective capacity electrode films of pattern shapes and the respective capacity electrode portions.

The connections of the earth electrode films of pattern shapes 401, 403, 405, 407, 409, 413, 414 and the earth electrode portions 410, 411, 412 are effected through the side face electrodes 800*d* through 800*f* without provision of the through holes as in the connection of the capacity electrode pattern and the capacity electrode. The respective side face electrodes 800*a* through 800*c*, and 800*d* through 800*f* go round the surface of the dielectric basic plate 100′ so as to effect the connections among the input, output terminals 71*a* through 71*c* and the connecting terminals 71*d* through 71*f* formed on the case 71. The surface electrodes 80*a* through 80*c*, and 80*d* through 80*f* are formed respectively on the surface of the dielectric basic plate 100′.

A case 71 composed of resin moldings is selected into approximately an "H" sectional shape with a through hole 70*a* for inserting a magnet being formed in the central portion thereof. The dielectric basic plate 100′ is disposed in the concave portion 70*c* on the lower side of the case 71, and further a ferrite plate 6 and an earth plate 8 are disposed under it. A metallic magnetic yoke 72 is engaged into the upper, lower concave portions 70*b*, 70*c* of the case 71 with the magnet 9, the dielectric basic plate 100′, the ferrite plate 6 and the earth plate 8 being therebetween. Thereafter, the yoke 72 is secured to the case 71.

Input, output terminals 71*b*, 71*c* and the earth terminal 71*d* are formed on one side face of the case 71. An input, output terminal 71*a* and the earth terminals 71*e*, 71*f* are formed on the opposite side face. (In FIG. 19, as the opposite side face of the case 71 is hidden, the input, output terminal 71*a* and the earth terminals 71*e*, 71*f* are not shown.) The respective input, output terminals 71*a* through 71*c* and the earth terminals 71*d* through 71*f* extend into the interior of the case 71 as shown in FIG. 20 and are exposed to the ceiling face of the concave portion 70*c* on the lower side of the case 71. The surface electrodes 80*a* through 80*c* are respectively in contact with the input, output terminals 71*a* through 71*c*. The surface electrodes 80*d* through 80*f* are respectively in contact with the earth terminals 71*d* through 71*f*.

A circulator shown in FIG. 19 and FIG. 20 constructed as described hereinabove functions as in a circulator shown in FIG. 1 and FIG. 2, and can be used as an isolator.

In the embodiment shown in FIG. 19 and FIG. 20, the connections among the respective capacity electrode films of pattern shapes and the respective capacity electrode portions, and the connections among the respective earth electrode films of pattern shapes and the respective earth electrode portions are designed to be effected with the use of the side face electrode. As in the embodiment shown in FIG. 1 and FIG. 2, these connections can also be effected with the through holes.

As a plurality of electrode films of pattern shapes are adapted to be disposed in lamination within one dielectric basic plate in accordance with the invention of the above described embodiment, the smaller size and higher performance of the whole element can be improved. As the internal circuit disposed conventionally on the same level can be disposed in three dimensions within the dielectric basic plate, the circuit area of the whole elements can be made smaller in size. As the respective electrode films of pattern shapes can be crossed without mutual contact within the interior of the dielectric basic plate, the insertion loss can be reduced without the requirement of the narrower width of the central electrode. As the construction is integral, sufficiently larger strength can be retained if the interval among the respective electrode films of pattern shapes are extremely narrowed. Therefore, the electric symmetry among the respective central electrodes is retained in a better balance.

As one or more capacitor for matching can be disposed in lamination between the central electrode pattern and the earth electrode pattern in accordance with the invention of the above described embodiment, the capacity value necessary for the matching circuit can be retained in small circuit area and the size of the whole element can be made smaller.

As a plurality of dielectric green sheets are fired collectively and are integrated into one dielectric basic plate after a plurality of dielectric green sheets are adhered under pressure in lamination with given electrode films of pattern shapes being formed on them in accordance with the invention of the above described embodiment, the dielectric basic plate and the inner circuit can be formed with ore co-firing step and the manufacturing time can be considerably shortened.

(Third Embodiment)

Figure 21:
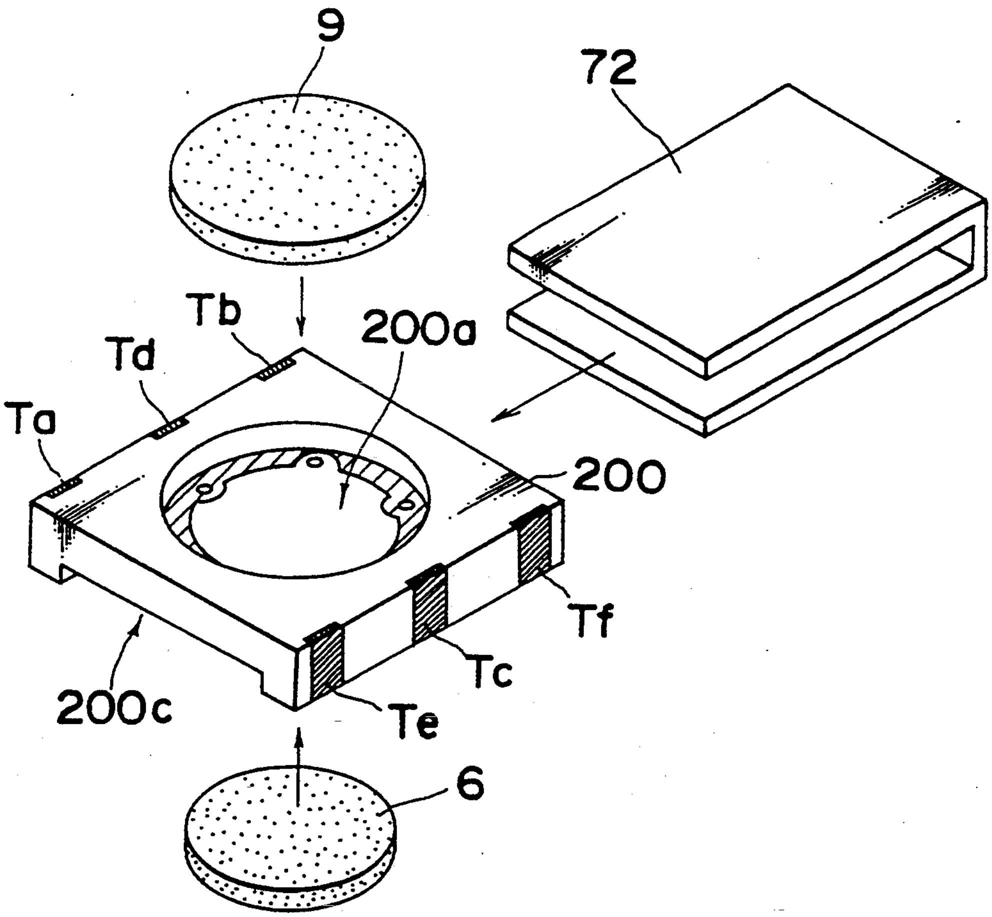
FIG. 21 is a perspective view of the essential portions of a circulator in accordance with a third embodiment of the present invention.
Figure 22:
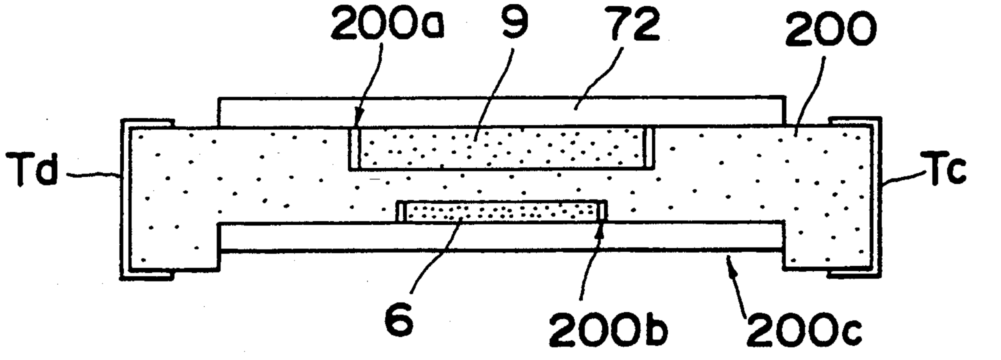
FIG. 22 is a sectional view of a circulator in accordance with the third embodiment of the present invention.
Figure 23:
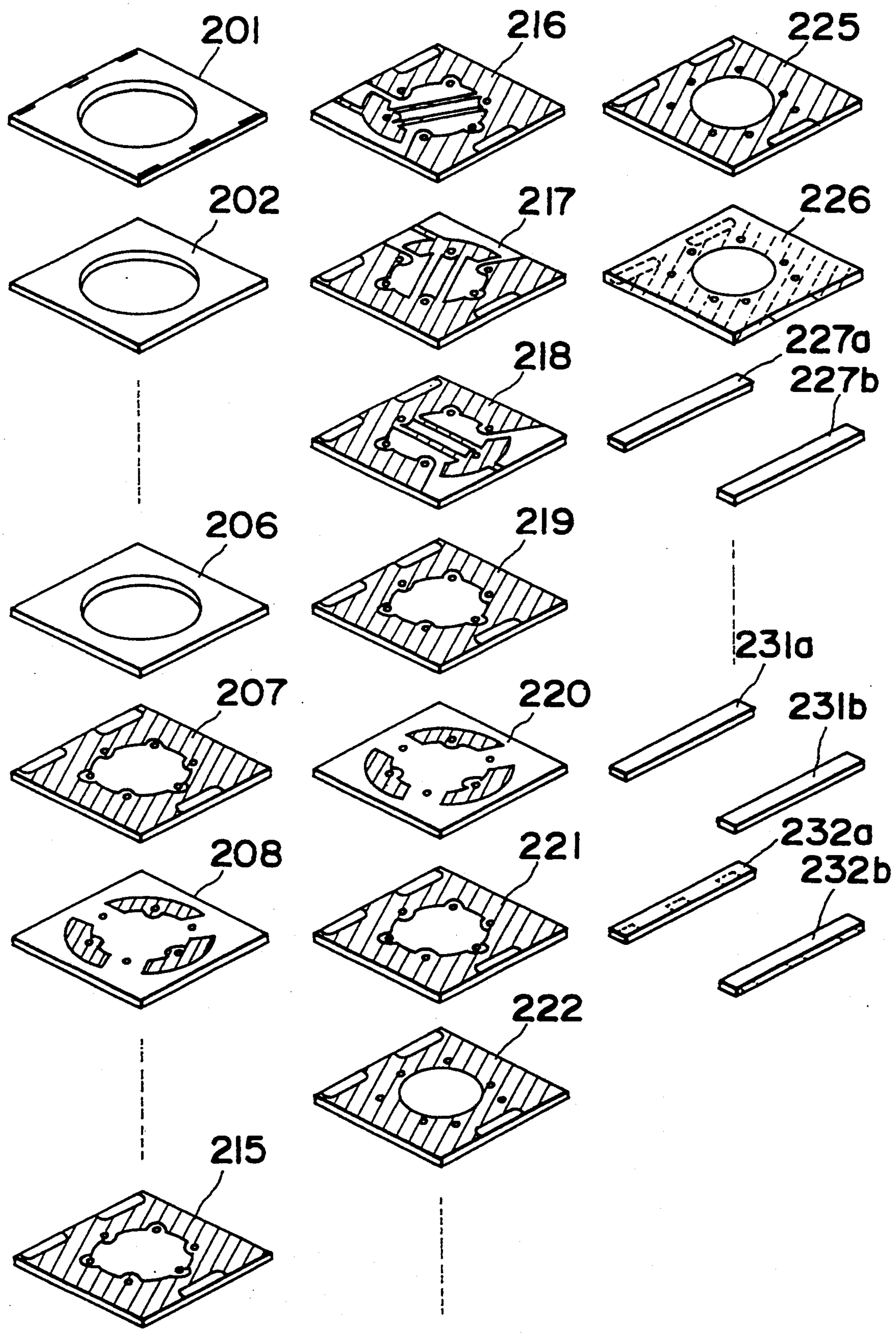
FIG. 23 shows the manufacturing of a dielectric basic plate to be used in the third embodiment of the present invention, showing the laminating relation of the ceramic green sheet before the co-firing operation.
Figure 24:
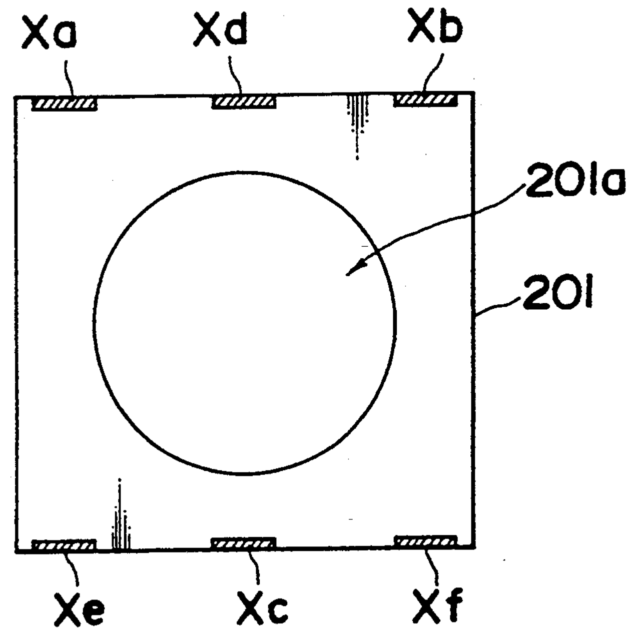
FIG. 24 is a top face view of a first ceramic green sheet.
Figure 25:
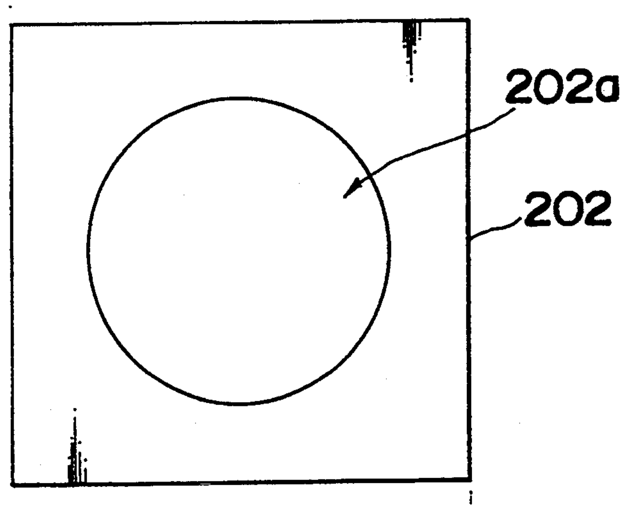
FIG. 25 is a top face view of a second ceramic green sheet.
Figure 26:
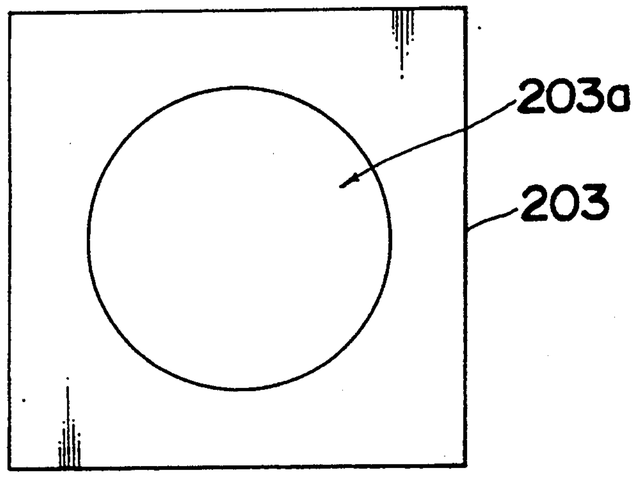
FIG. 26 is a top face view of a third ceramic green sheet.
Figure 27:
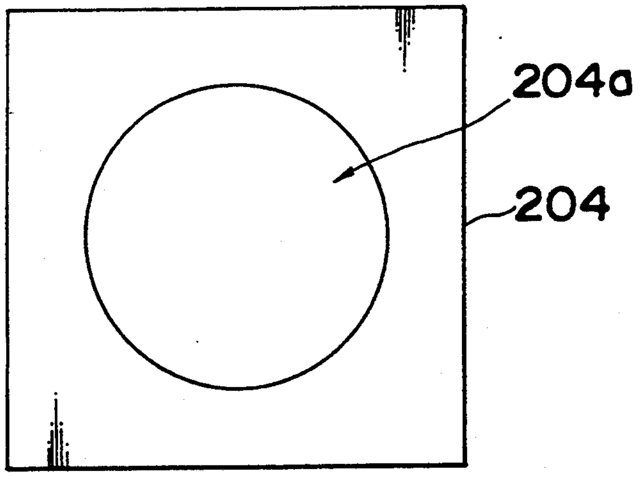
FIG. 27 is a top face view of a fourth ceramic green sheet.
Figure 28:
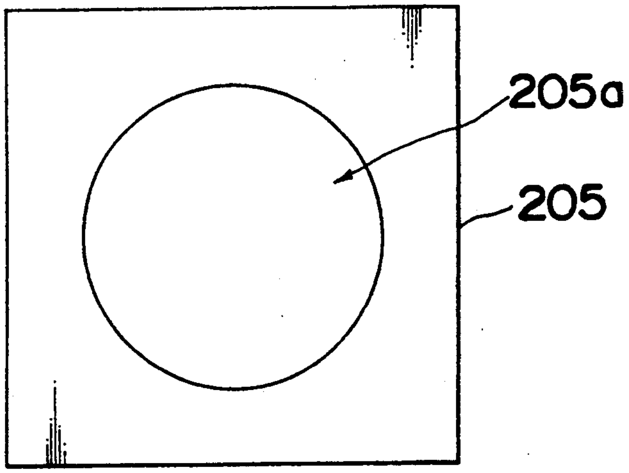
FIG. 28 is a top face view of a fifth ceramic green sheet.
Figure 29:
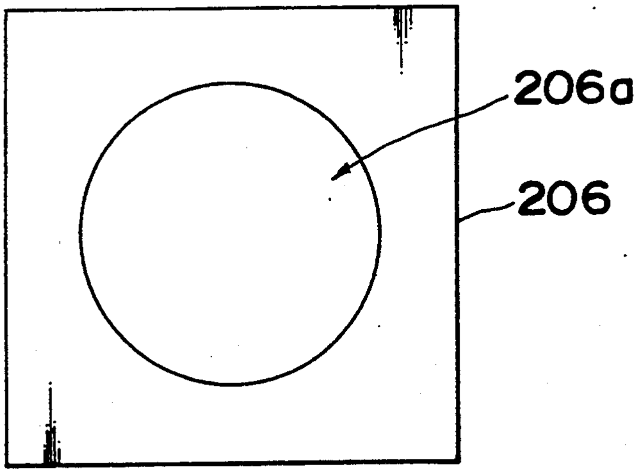
FIG. 29 is a top face view of a sixth ceramic green sheet.

FIG. 21 through FIG. 55 are views showing the construction of a circulator in accordance with a third embodiment of the present invention. FIG. 21 is a perspective view of the essential portions of the circulator. FIG. 22 is a sectional view of the circulator. FIG. 23 is a perspective view showing the lamination relation of the ceramic green sheet before the co-firing operation. FIG. 24 through FIG. 55 are plan views showing the electrode films of pattern shapes in the respective ceramic greens sheets. The third embodiment of the present invention will be described with reference to FIG. 21 through FIG. 55.

As shown in FIG. 21 and FIG. 22, circular concave portion 2100*a* is formed in the surface central portion of the dielectric basic plate 2100, and a circular concave portion 2100*b* is formed in the reverse face central portion. A stage difference concave portion 2100*c* is formed on the reverse face of the dielectric basic plate 2100. External connecting terminals Ta through Tf are formed on the side face of the dielectric basic plate 2100. A magnet 9 is engaged with the concave portion 2100*a*, and is secured to the dielectric basic plate 2100 with binding or the like. A ferrite plate 6 is engaged with the concave portion 2100*b* and is secured to the dielectric basic plate 2100 with bonding or the like. The metallic magnetic yoke 72 is engaged with the dielectric basic plate 2100 so as to enclose the magnet 9 and the ferrite plate 6 therebetween. As the magnetic yoke 72 is engaged into the stage difference concave portion 200*c* on the reverse face of the dielectric basic plate 200 at this time, the height of the formed portion of the external connecting terminals Ta through Tf becomes higher than the height of the surface of the magnetic yoke 72 on the reverse face of the dielectric basic plate 2100. This makes the surface mounting operation possible to effect onto the circuit basic plate.

The above described dielectric basic plate 200 is collectively fired and composed as shown in FIG. 23 after a plurality of ceramic green sheets 201 through 232*a*, 232*b* with given electrode films of pattern shapes being formed are laminated, and adhered under pressure. The ceramic green sheets are thin (normally of several 10$\mu$ or so) sheet shaped member having flexibility, and are obtained by, for example, an extrusion molding with ceramic powder unfired or temporarily fired being mixed, kneaded with an organic solvent which is a binder. A material having high Q in the frequency region and high $\epsilon_T$ (for example, $\epsilon_T=20$ through 100), for example, dielectric material of $MgTiO_3$—$CiTiO_3$ series, $ZrO_2$—$SnO_2$—$TiO_2$ series, $BaTi_4O_9$ series, or $Nd_2Ti_2O_7$—(BaPb) $TiO_3$—$TiO_2$ series is used as a ceramic green sheet material. The formation of the respective electrode pattern is formed by, for example, printing, evaporating operations and so on, with an electrode material such as Pd, Pt and so on being selected in relation to the sintering temperature of the dielectric material. The respective ceramic green sheets 201 through 232 are fused, and integrated after collective co-firing into one dielectric basic plate 200.

As shown in FIG. 24 through FIG. 29, circular through holes 201*a* through 206*a* are formed in the respective central portions in approximately square shaped ceramic green sheets 201 through 206. When the ceramic green sheets 201 through 206 have been laminated, these through holes 201*a* through 206*a* form a concave portion 200*a* for receiving the magnet 9. On the surface of the ceramic green sheet 201, electrodes Xa, Xd, Xb are formed near the left-hand side, and electrodes Xe, Xc, Xf are formed near the right-hand side.

Figure 30:
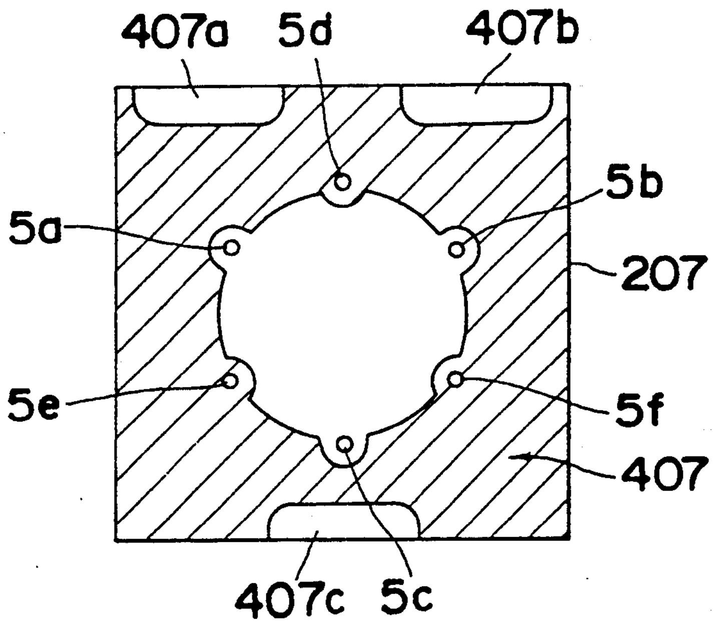
FIG. 30 is a top face view of a seventh ceramic green sheet.
Figure 31:
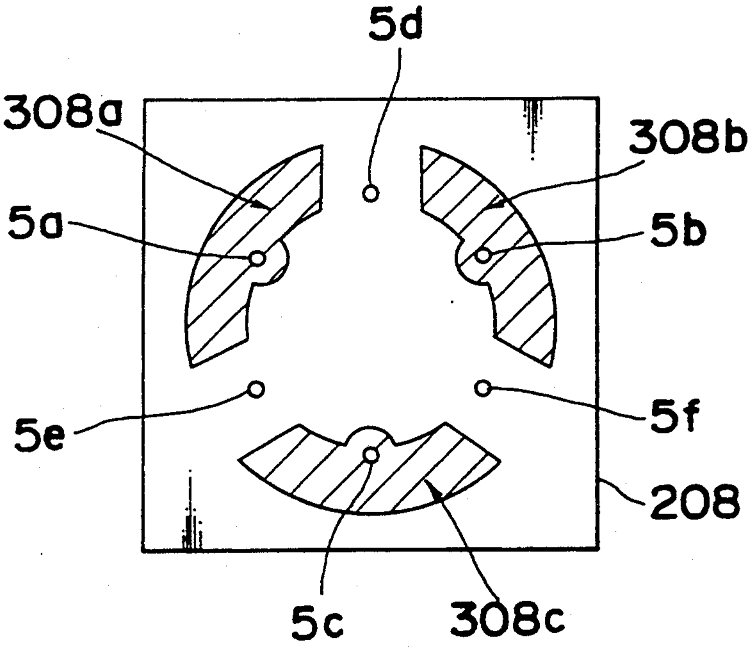
FIG. 31 is a top face view of an eighth ceramic green sheet.
Figure 32:
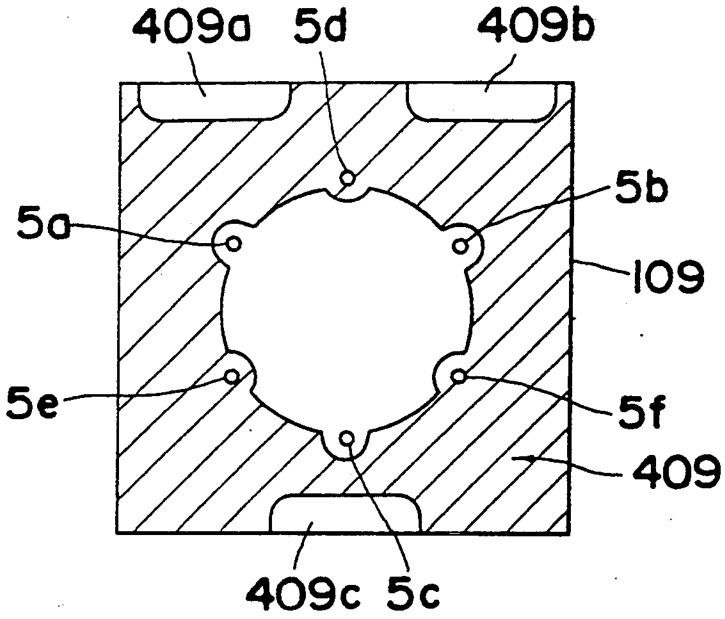
FIG. 32 is a top face view of a ninth ceramic green sheet.
Figure 33:
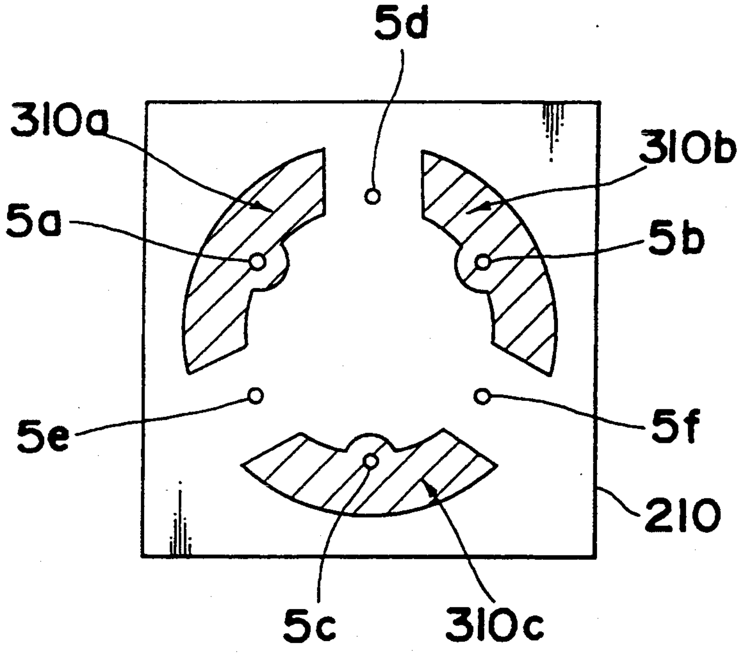
FIG. 33 is a top face view of a tenth ceramic green sheet.
Figure 34:
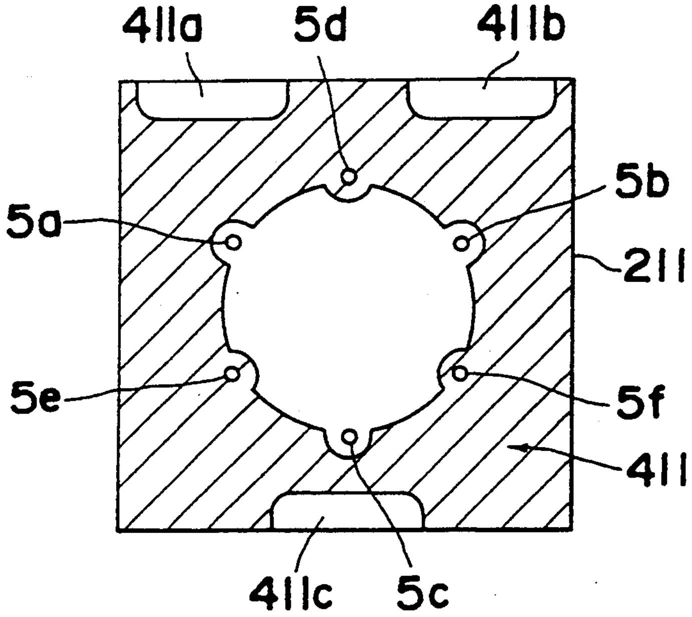
FIG. 34 is a top face view of an eleventh ceramic greens sheet.
Figure 35:
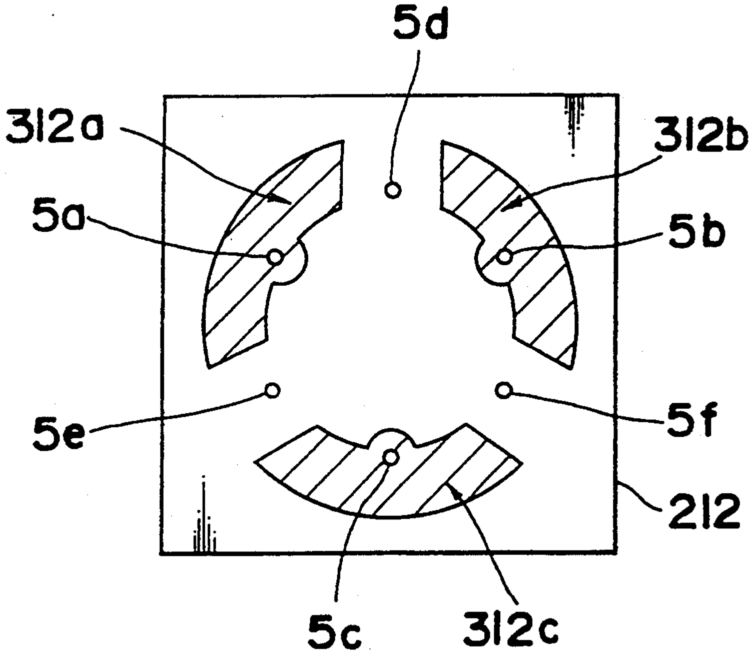
FIG. 35 is a top face view of a twelfth ceramic green sheet.
Figure 36:
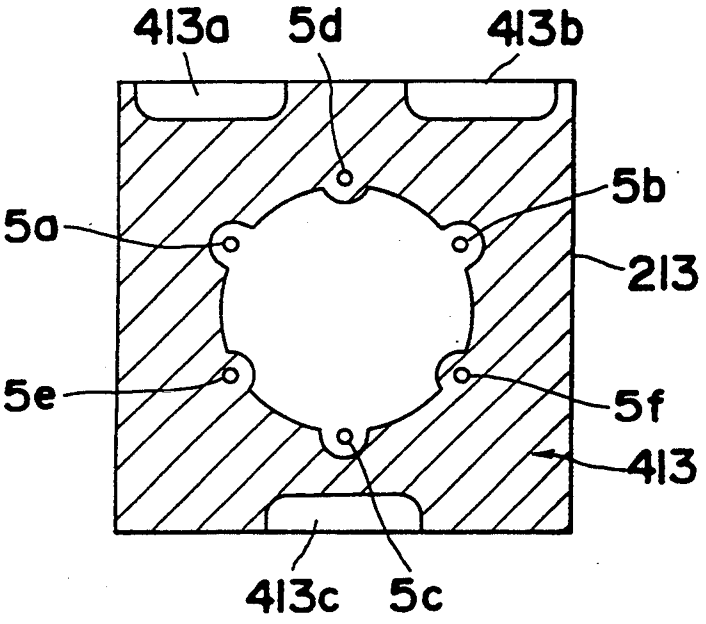
FIG. 36 is a top face view of a thirteenth ceramic green sheet.
Figure 37:
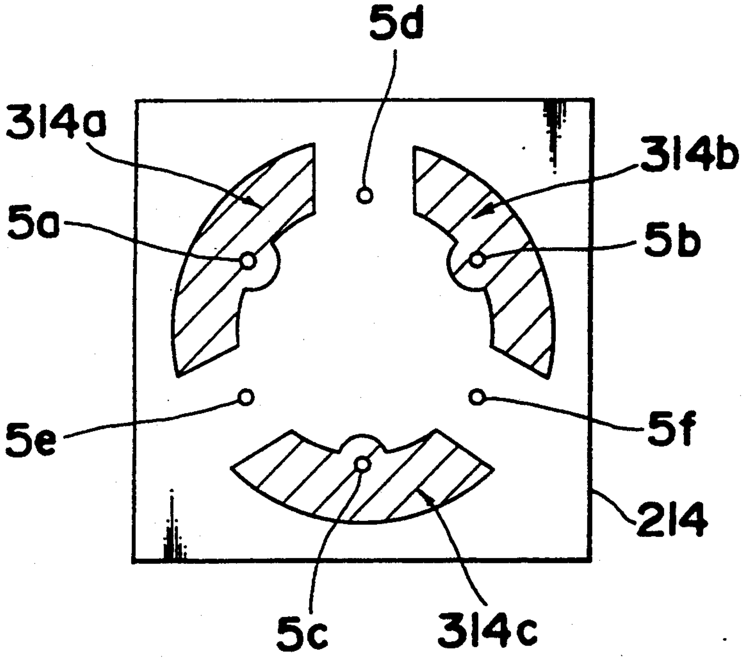
FIG. 37 is a top face view of a fourteenth ceramic green sheet.
Figure 38:
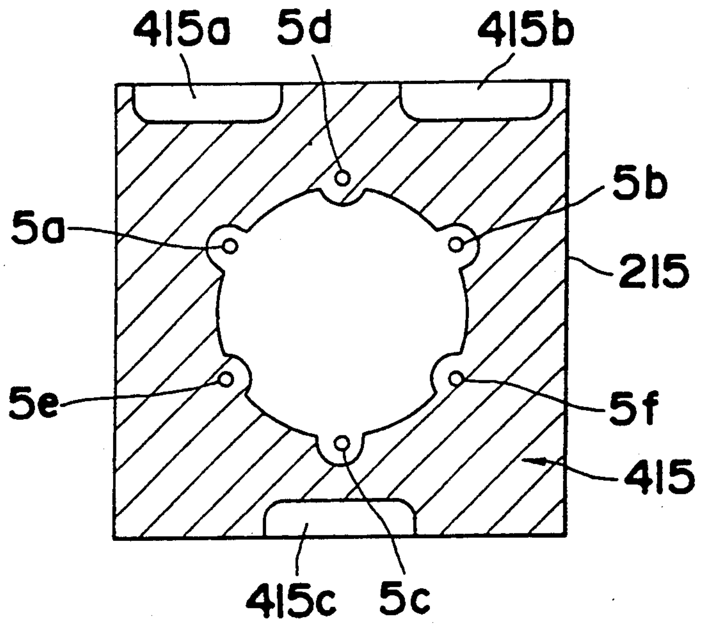
FIG. 38 is a top face view of a fifteenth ceramic green sheet.
Figure 39:
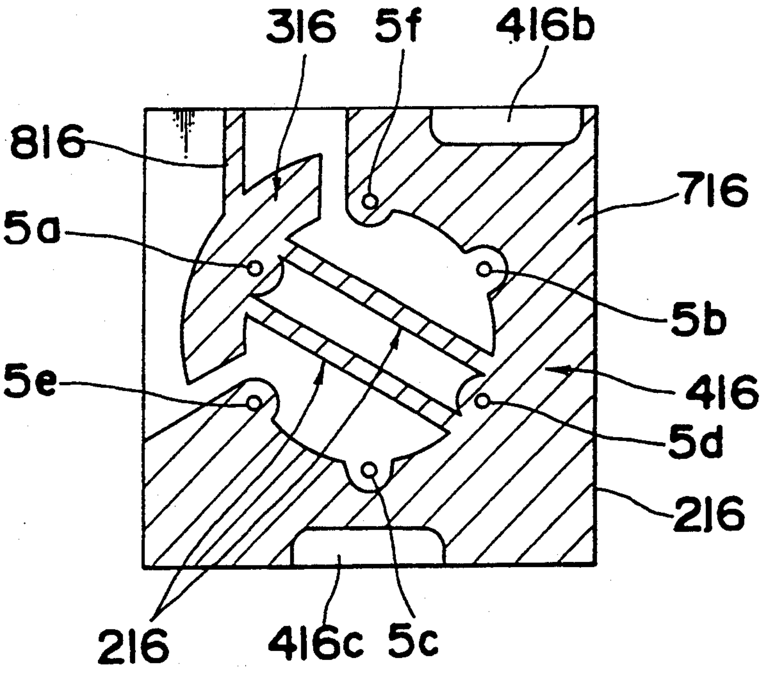
FIG. 39 is a top face view of a sixteenth ceramic green sheet.
Figure 40:
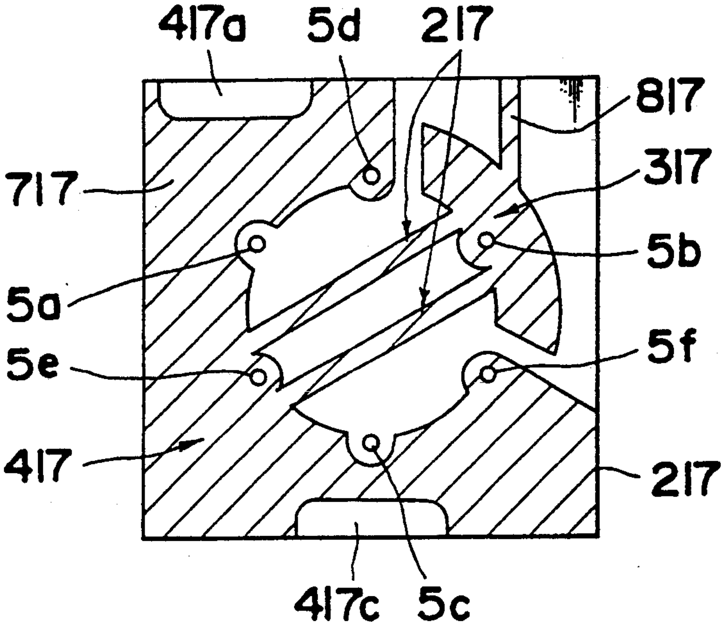
FIG. 40 is a top face view of a seventeenth ceramic green sheet.
Figure 41:
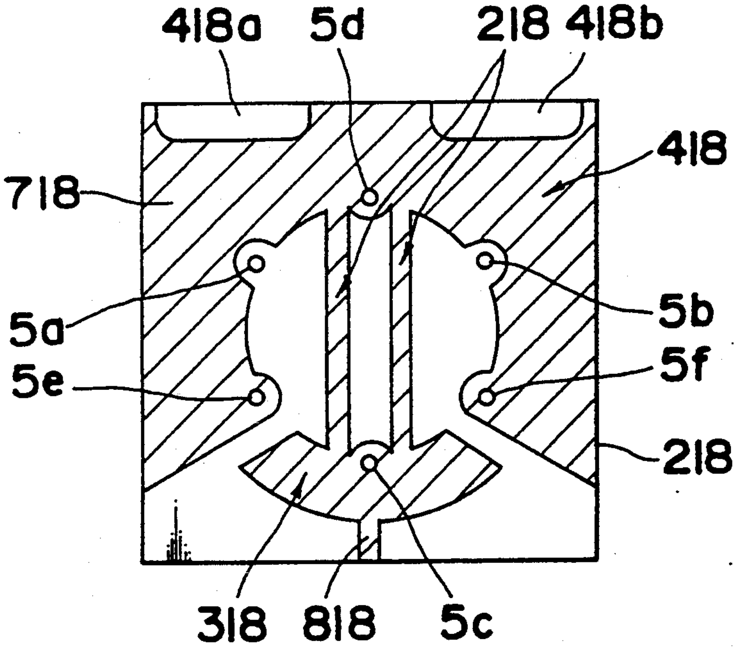
FIG. 41 is a top face view of an eighteenth ceramic green sheet.
Figure 42:
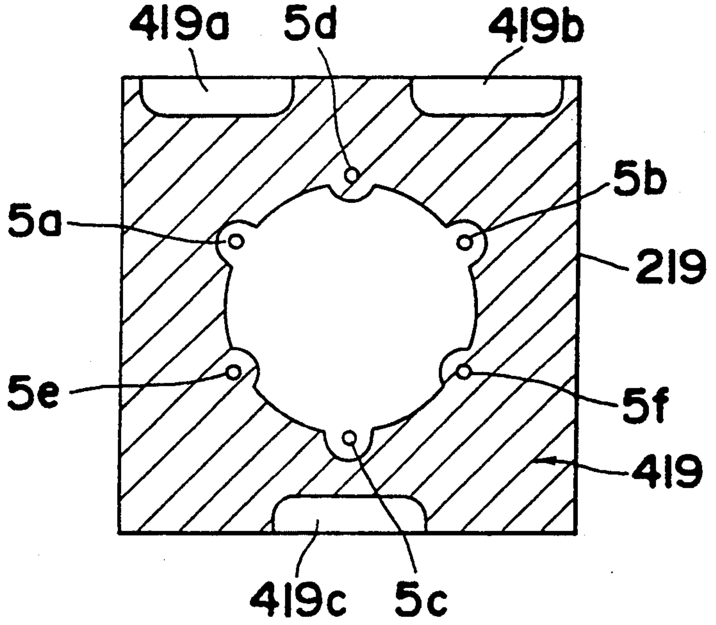
FIG. 42 is a top face view of a nineteenth ceramic green sheet.
Figure 43:
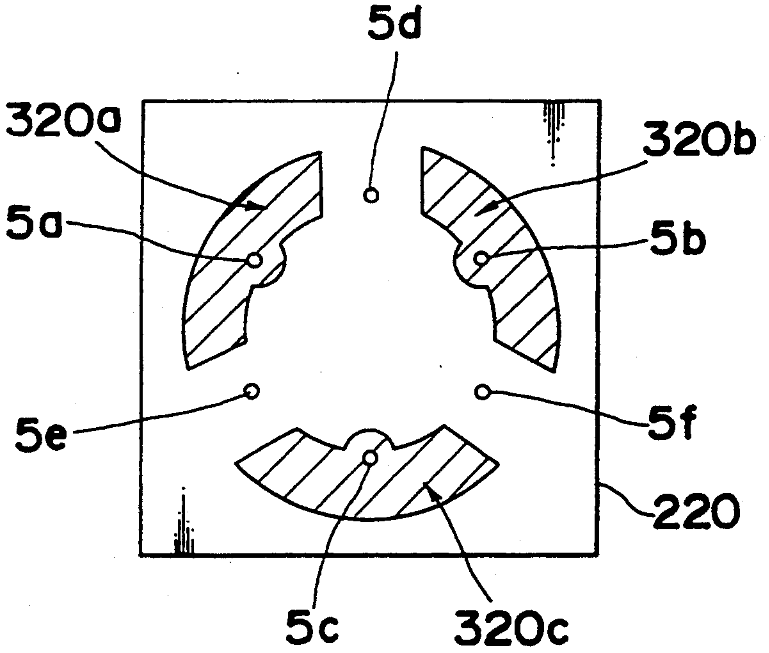
FIG. 43 is as top face view of a twentieth ceramic green sheet.
Figure 44:
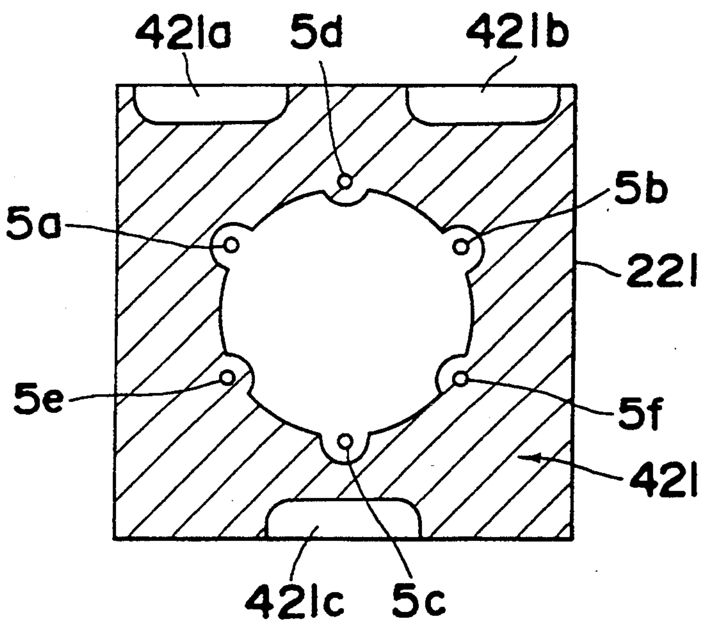
FIG. 44 is a top face view of a twenty first ceramic green sheet.
Figure 45:
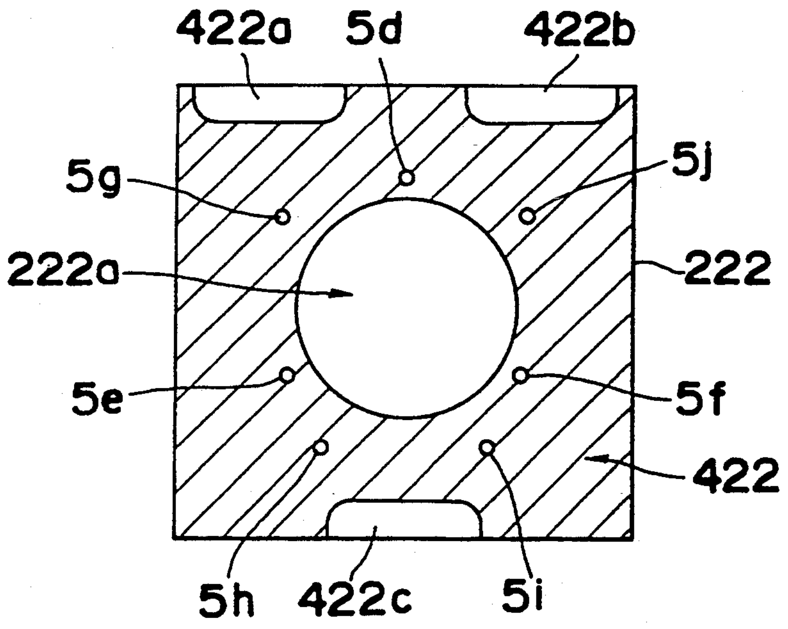
FIG. 45 is a top face view of a twenty second ceramic green sheet.
Figure 46:
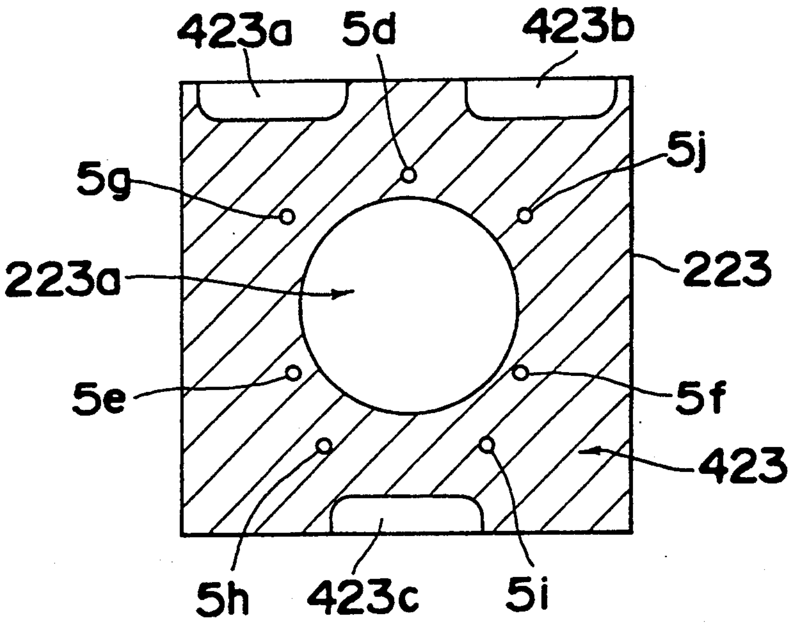
FIG. 46 is a top face view of a twenty third ceramic green sheet.
Figure 47:
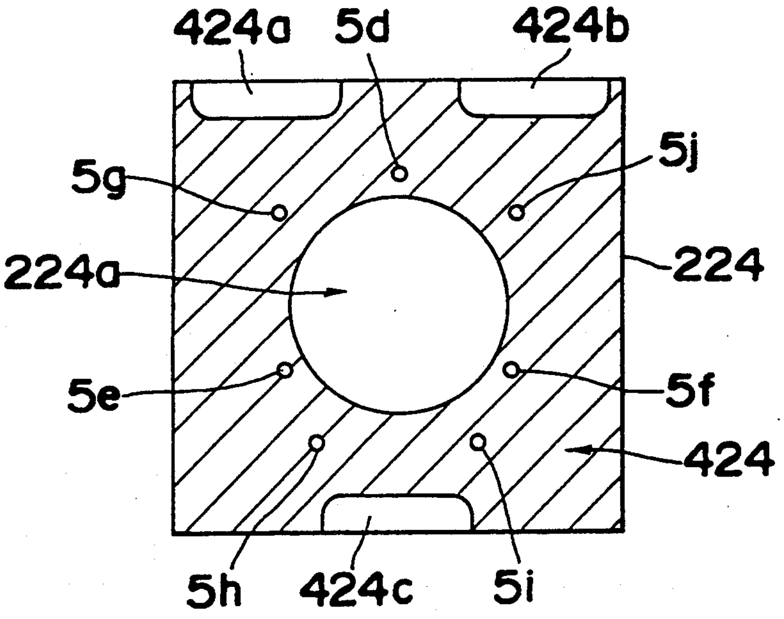
FIG. 47 is a top face view of a twenty fourth ceramic green sheet.
Figure 48:
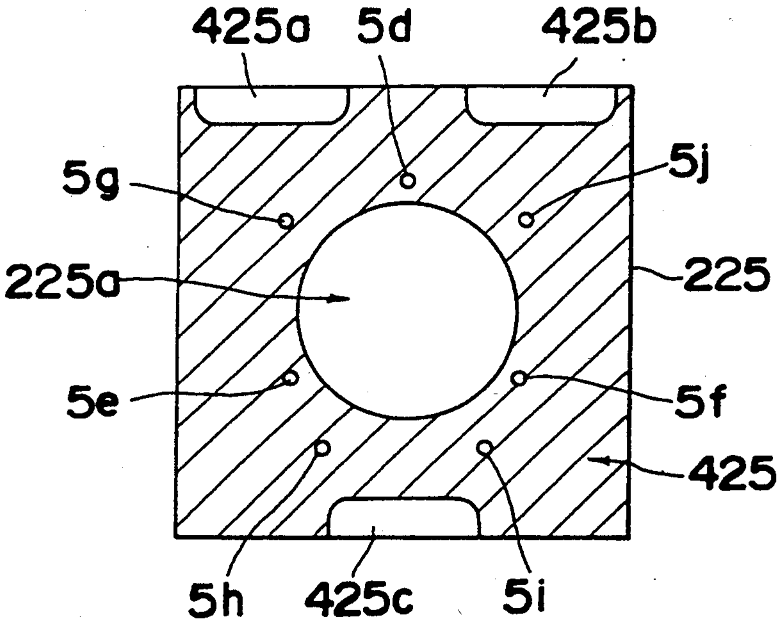
FIG. 48 is a top face view of a twenty fifth ceramic green sheet.
Figure 49:
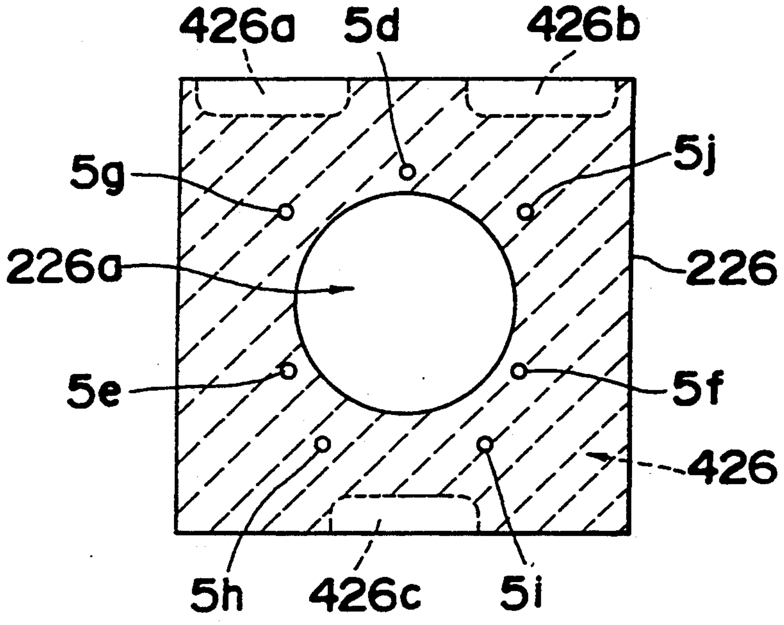
FIG. 49 is a top face view of a twenty sixth ceramic green sheet.
Figure 50:
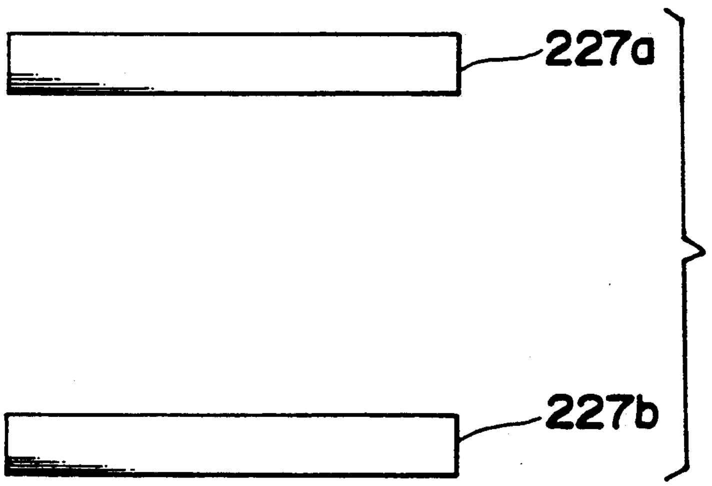
FIG. 50 is a top face view of a twenty seventh ceramic green sheet.
Figure 51:
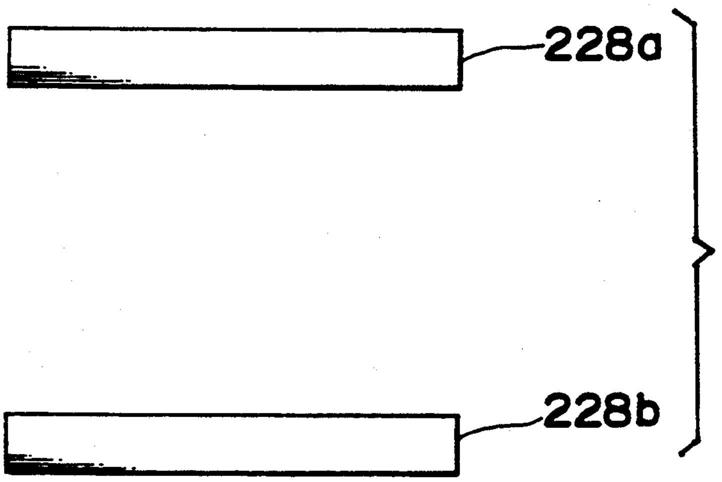
FIG. 51 is a top face view of a twenty eighth ceramic green sheet.
Figure 52:
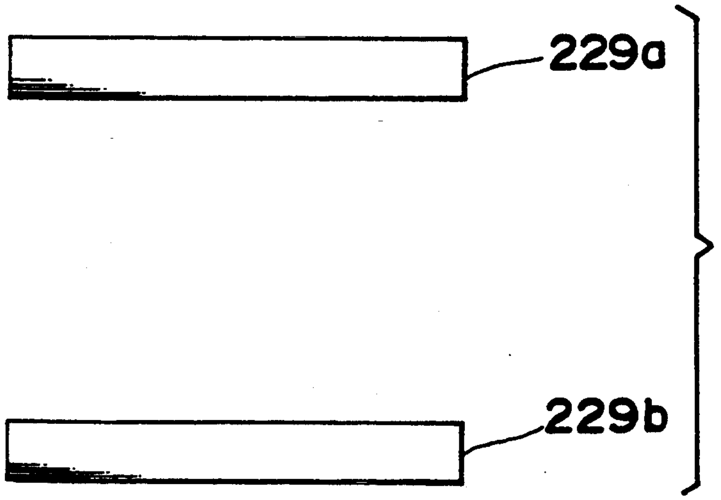
FIG. 52 is a top face view of a twenty ninth ceramic green sheet.
Figure 53:
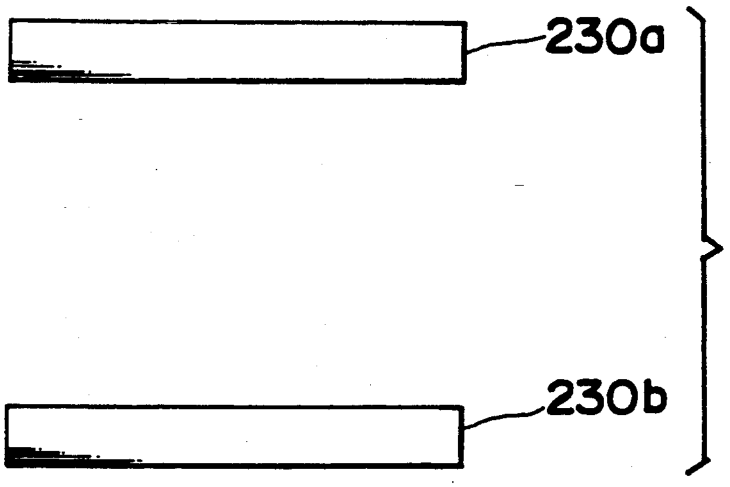
FIG. 53 is a top face view of a thirtieth ceramic green sheet.
Figure 54:
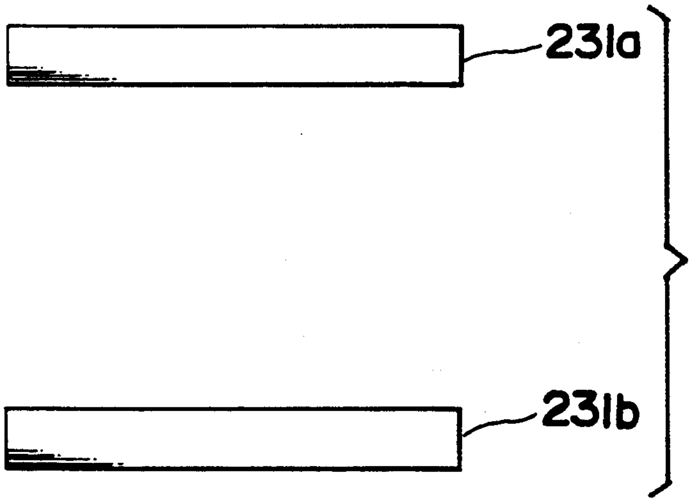
FIG. 54 is a top face view of a thirty first ceramic green sheet.
Figure 55:
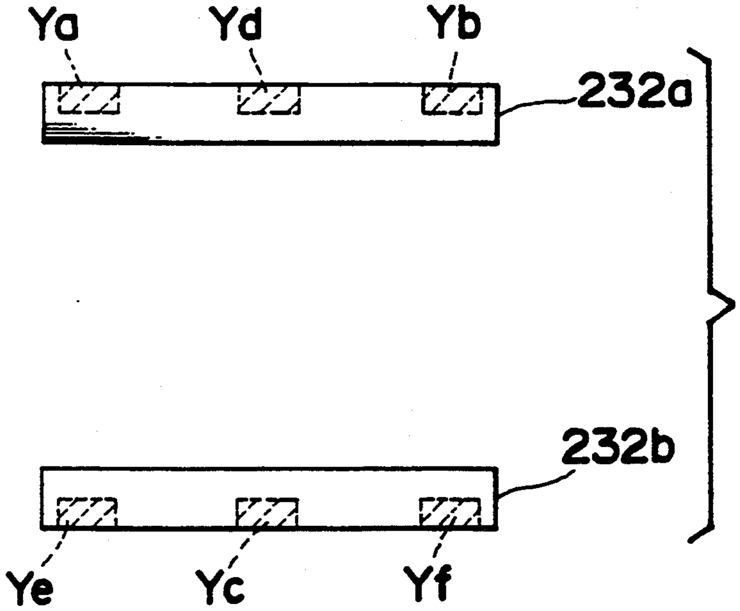
FIG. 55 is a top face view of a thirty second ceramic green sheet.
Figure 56:
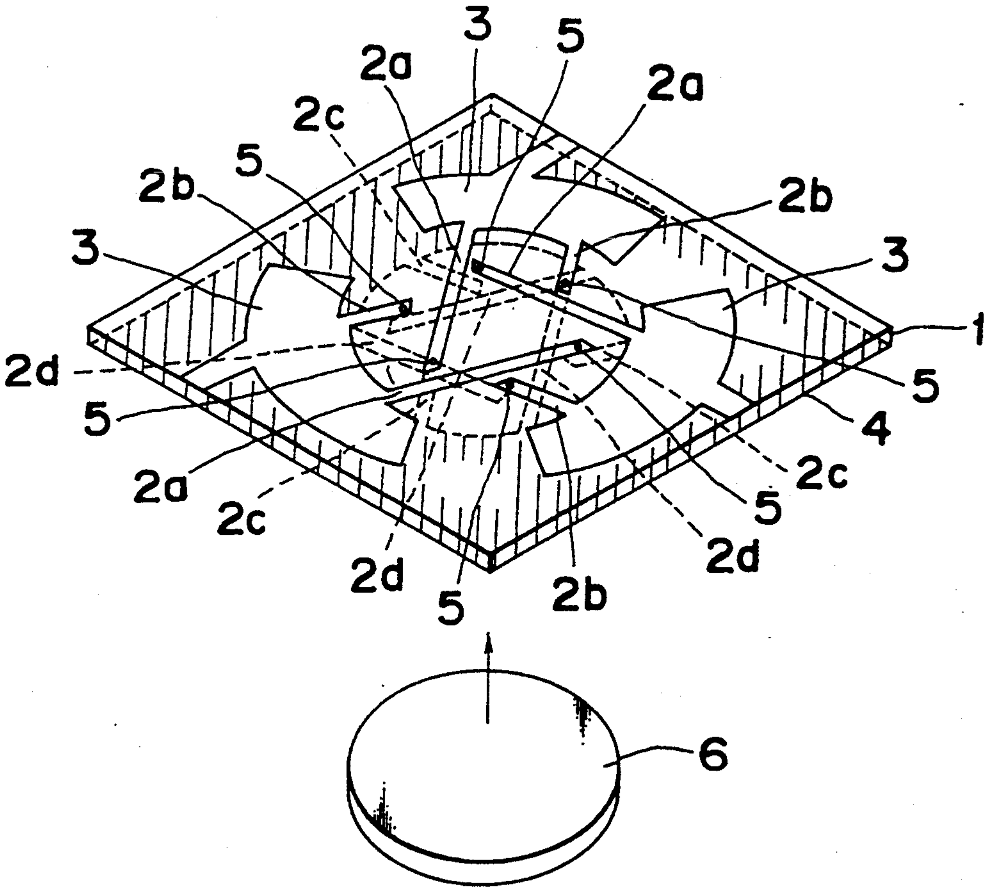
Fig. 56 PRIOR ART
FIG. 56 is a perspective view of the essential portions of a circulator in accordance with a first prior art example.

As shown in FIG. 30, FIG. 32, FIG. 34. FIG. 36, FIG. 38, FIG. 42, FIG. 44, earth electrode films of pattern shapes 407, 409, 411, 413, 415, 419, 421 on the same shape are formed respectively on the surfaces of the ceramic green sheets 207, 209, 211, 213, 215, 219, 221. As shown in FIG. 31, FIG. 33, FIG. 35, FIG. 37, FIG. 43, capacity electrode films of pattern shapes 308*a* through 308c, 310a through 310c, 312a through 312c, 314a through 314c, 320a through 320c on the same form are formed respectively on the surfaces of ceramic green sheets 208, 210, 212, 214, 220.

Electrode films of pattern shapes 716, 717, 718 on approximately same form are formed respectively on the surfaces of the ceramic green sheets 216, 217, 218. Respective electrode films of pattern shapes 716 through 718 are disposed each being shifted at an angular interval of 120° with respect to one another. The electrode pattern 716 includes a central electrode portion 216, a capacity electrode portion 316, an earth electrode portion 416, a wiring portion 816. The electrode pattern 717 includes a central electrode portion 217, a capacity electrode portion 317, an earth electrode portion 417, a wiring portion 817. An electrode pattern 718 includes a central electrode portion 218, a capacity electrode portion 318, an earth electrode portion 418, a wiring portion 818. Capacity electrode portions 316, 317, 318 are respectively connected with one end of the central electrode portions 216, 217, 218. Earth electrode portions 416, 417, 418 are respectively connected with the other end of the central electrodes 216, 217, 218. Capacity electrode portions 316, 317, 318 are respectively drawn out so far as the end portions of the ceramic green sheets 216, 217, 218 through wiring portions 816, 817, 818.

Capacity electrode films of pattern shapes 308a, 310a, 312a, 314a, 320a and the capacity electrode portion 316 are connected with each other through a through hole 5a. Capacity electrode films of pattern shapes 308b, 310b, 312b, 314b, 320b and the capacity electrode portion 317 are connected with each other through a through hole 5b. The capacity electrode films of pattern shapes 308c, 310c, 312c, 314c, 320c and the capacity electrode 317 are connected with each other through a through hole 5c. The earth electrode films of pattern shapes 407, 409, 411, 413, 415, 419, 421 and the earth electrode portions 416, 417, 418 are connected with each other through through holes 5d, 5e, 5f.

When such ceramic green sheets 210 through 224 as described hereinabove have been laminated, the capacity electrode pattern 308a forms a first capacitor by opposition between the earth electrode films of pattern shapes 407 and 409. The capacity electrode pattern 310a forms a second capacitor by the opposition between the earth electrode films of pattern shapes 409 and 411. The capacity electrode pattern 312a forms a third capacitor by the opposition between the earth electrode films of pattern shapes 411 and 413. The capacity electrode pattern 314a forms a fourth capacitor by the opposition between the earth electrode films of pattern shapes 413 and 415. The capacity electrode portion 316 forms a fifth capacitor by the opposition between the earth electrode pattern 415 and the earth electrode portion 417. The capacity electrode pattern 320a forms a sixth capacitor by the opposition between the earth electrode films of pattern shapes 419 and 421. These first through sixth capacitors for composing the matching circuit are connected in parallel between one end of the central electrode portion 216 and the earth, and are inserted. This is because the respective one side electrodes 308a, 310a, 312a, 314a, 316, 320a are connected with one end of the central electrode portion 216 in common through a through hole 5a. The respective other-way electrodes 407, 409, 411, 413, 415, 417, 419, 421 of the first through sixth capacitors are connected with the earth in common through the through holes 5d, 5e, 5f. Similarly, six capacitors for matching circuit use are connected in parallel between the central electrode portion 217 and the earth, and are inserted, and the six capacitors for matching circuit use are connected in parallel between the central electrode portion 218 and the earth, and are interposed. As a plurality of capacitors connected respectively in parallel are laminated, disposed among one end of the respective central electrode portions 216 through 218 and the earth, the capacity value necessary for the matching circuit can be retained with small circuit area. Accordingly, the construction of the whole element can be made smaller in size.

Approximately same shaped earth electrode films of pattern shapes 222 though 226 are formed on the surface of the ceramic green sheets 222 through 225 and the reverse face of the ceramic green sheet 226 as shown in FIG. 45 through FIG. 49. Through holes 222a through 226a are formed in the central portions of the respective ceramic green sheets 222 through 226. The through holes 222a through 226a form the concave portion 200b for receiving the ferrite plate 6 when the ceramic green sheets 222 through 226 have been laminated. The earth electrode films of pattern shapes 222 through 226 are connected with the above described earth electrode films of pattern shapes 407, 409, 411, 413, 515, 419, 421 and the earth electrode portions 416 through 418 are connected through the through holes 5d through 5f and also, are connected with one another through the through holes 5d through 5j.

Four earth electrode films of pattern shapes 222 through 225 are provided between the earth electrode pattern 221 and the earth electrode pattern 226 and further, four through holes 5g through 5j are increased in number as described hereinabove so as to effect connecting operations among the respective earth electrode films of pattern shapes 222 through 226. The reasons why the connections are effected are as follows. Namely, a ferrite plate 6 is mounted as described in the concave portion 200b formed by the through holes 222a through 226a, and many high frequency magnetic fields are caused by high frequency signals flowing through the respective central electrode portions 216 through 218 on the periphery of the ferrite plate 6. Therefore, the periphery of the ferrite plate 6 becomes an environment in which high frequency induced current is easier to flow. If a connecting operation is effected between the earth electrode pattern 221 and the earth electrode pattern 226 only by three through holes 5d through 5f under such environment, an impedance between the earth electrode pattern 221 and the earth electrode pattern 226 is increased as a result of an increase in the resistance component and the impedance component, thus resulting in larger losses. The resistance component and the impedance component are reduced with the increased provision of the through holes 5g through 5j, thereby reducing the impedance. The capacity components are provided in parallel with through holes 5d through 5j by the disposition of four earth electrode films of pattern shapes 222 through 225 between the earth electrode pattern 221 and the earth electrode pattern 226, whereby the reduction of the high frequency impedance is further reduced.

Band shaped ceramic green sheets 227a through 232a are laminated near the left-hand side, and band shaped ceramic green sheets 227b through 232b are laminated near the right-hand side on the reverse face of the ceramic green sheet 226 as shown in FIG. 50 through 55. Electrodes Ya, Yd, Yb are formed on the reverse face of the ceramic green sheet 232*a*, and the electrodes Ye, Yc, Yf are formed on the reverse face of the ceramic green sheets 232*b*. These ceramic green sheets 227*a* through 232*a* and ceramic green sheets 227*b* through 232*b* form a stage difference concave portion 200*c* for receiving the magnetic yoke 72 when they have been laminated.

The above described ceramic green sheets 201 through 232*a*, 232*b* are laminated, and thereafter are adhered under pressure into a ceramic green sheet laminated body. Continuously a copper electrode composed of copper paste or the like is printed with pressure film on three locations on the left side face of the ceramic green sheet laminated body and on three locations on the right side face, whereby external connecting terminals Ta through Tf are formed. Although the copper paste is protruded onto the surface of the ceramic green sheet 201 and the reverse face of the ceramic green sheets 232*a*, 232*b* in the pressure film printing step, the protruded portion is absorbed and equalized by electrode Ya through Yf formed on the surface of the ceramic green sheet 201 and the electrodes Ya through Yf formed on the ceramic green sheets 232*a*, 232*b*. Namely, if the copper paste is protruded onto the surface of the ceramic green sheet 201 and is protruded onto the reverse faces of the ceramic green sheets 232*a*, 232*b* by the pressure film printing operation, the area of the protruded portion is generally smaller than the areas of the above described electrode Xa through Xf and Ya through Yf. Therefore, in the respective external connecting terminals Ta through Tf, the area of the copper paste extruded onto the surface of the ceramic green sheet 201 becomes equal respectively to the area of the electrodes Xa through Xf. The area of the portion extruded onto the reverse faces of the ceramic green sheets 232*a*, 232*b* becomes respectively equal to the area of the electrodes Ya through Yf. As the areas of the electrodes Xa though Xf are mutually equal, and the areas of the electrodes Ya through Yf become also equal with respect to one another, the area of the portion extruded onto the surface of the ceramic green sheet 201 become likewise equal, and also, the areas of the portion extruded onto the reverse faces of the ceramic green sheets 232*a*, 232*b* become equal with respect to each other in the respective external connecting terminals Ta though Tf. As a result, the electric symmetry can be maintained properly without the provision of inequality in the area of the respective external connecting terminals Ta through Tf on the surface of the ceramic green sheet 201 and the reverse face of the ceramic green sheets 232*a*, 232*b*.

The above described ceramic green sheet laminated bodies are collectively fired. As a result, the respective ceramic greens sheets are fused, integrated into one dielectric basic plate 200. At this time, the respective electrode films of pattern shapes and the respective external connecting terminals are also integrated into dielectric basic plate 200. After the co-firing step, a Ni plating portion is effected on the surfaces of the respective external connecting terminals Ta through Tf so as to prevent the copper electrode, which becomes the foundation of the external connecting terminals Ta through Tf in a later soldering operation, from being diffused during the soldering operation. A Sn plating operation is effected upon the above described Ni plating so as to improve the soldering property of the respective external connecting terminals Ta through Tf.

Figure 57:
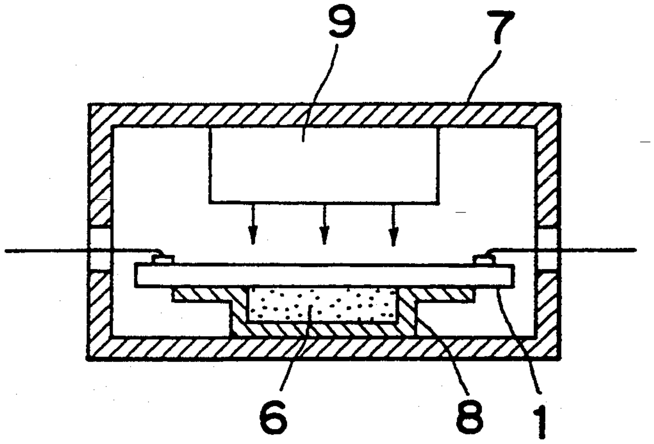
Fig. 57 PRIOR ART
FIG. 57 is a sectional view of a circulator in accordance with the first prior art.
Figure 58:
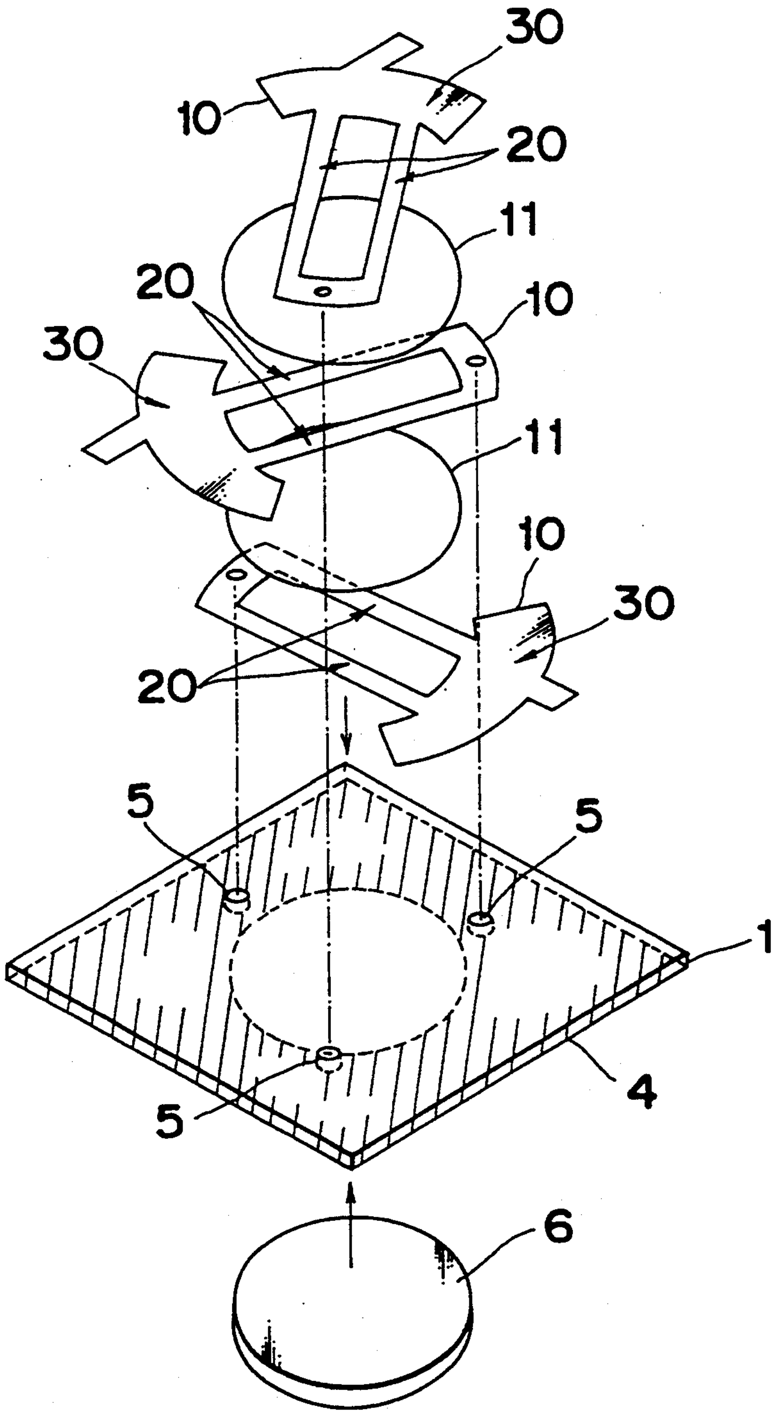
Fig. 58 PRIOR ART
FIG. 58 is an exploded perspective view of the essential portions of a circulator in accordance with a second prior art example.
Figure 59:
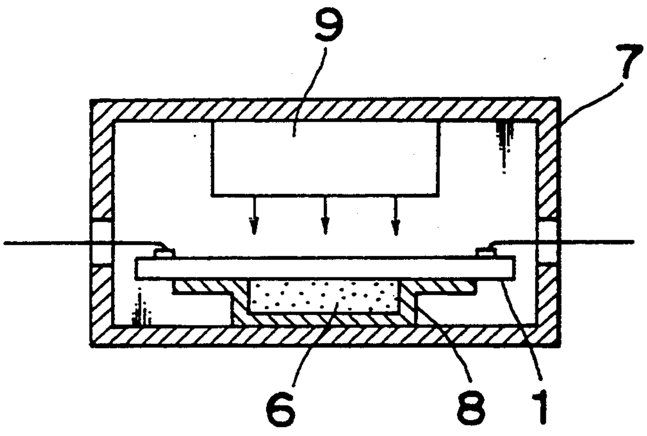
Fig. 59 PRIOR ART
FIG. 59 is a sectional view of a circulator in accordance with the second prior art.
Figure 60:
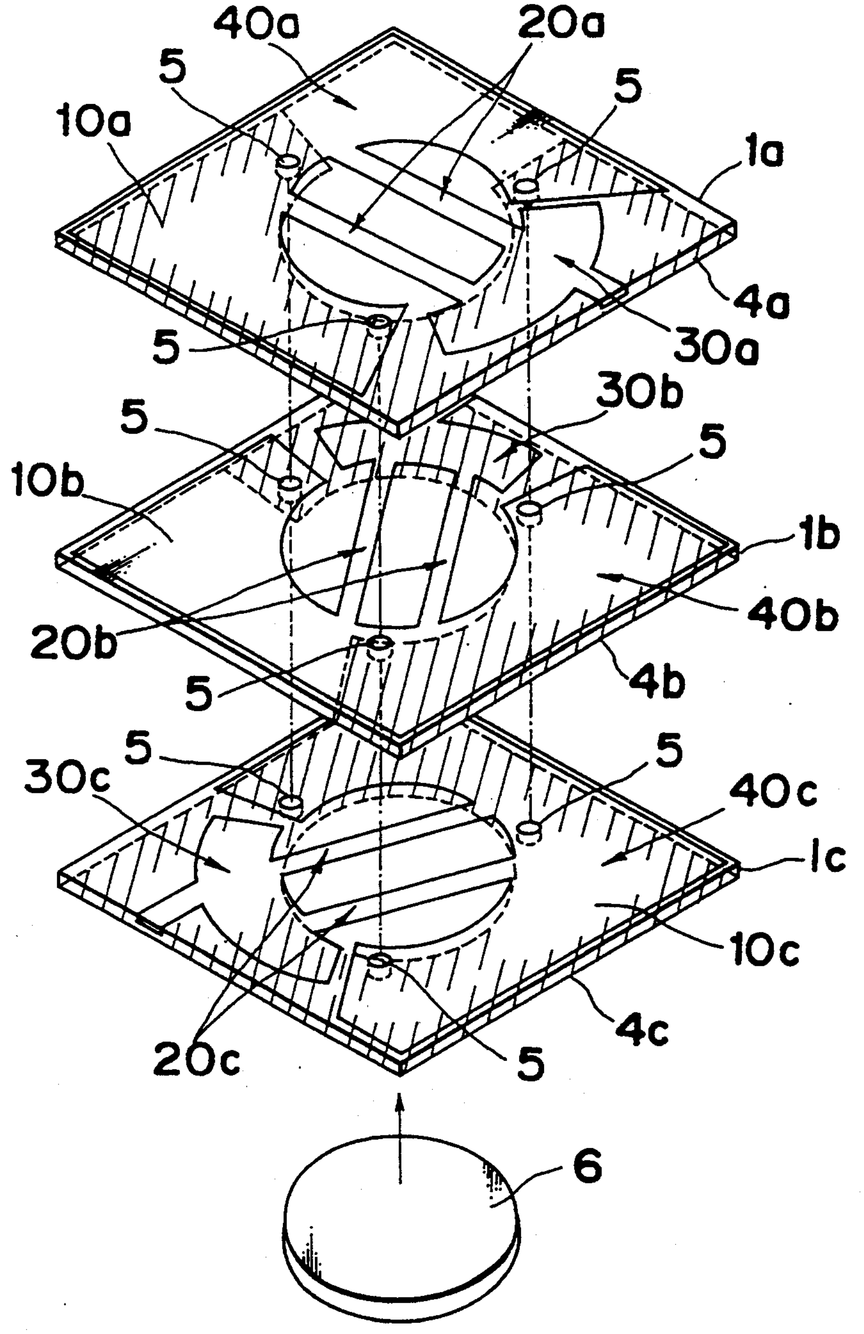
Fig. 60 PRIOR ART
FIG. 60 is a perspective view of the essential portions of a circulator in accordance with a third prior art example.
Figure 61:
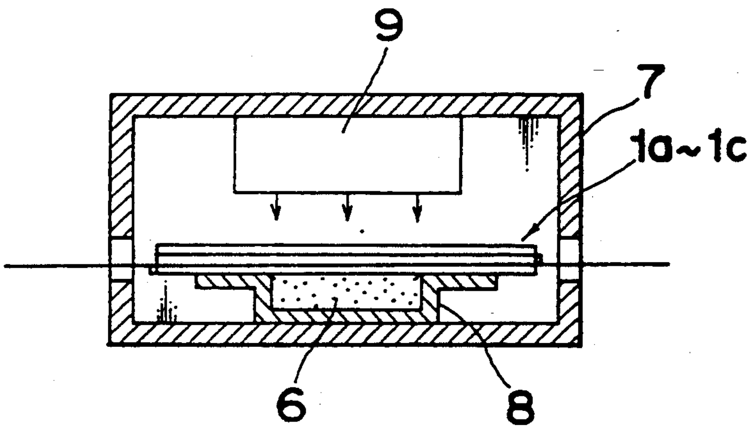
Fig. 61 PRIOR ART
FIG. 61 is a sectional view of a circulator in accordance with the third prior art.

As the dielectric basic plate, central electrode, matching circuit and the external connecting terminal can be fired at the same time by one co-firing step in the present embodiment, the manufacturing step is simplified and the manufacturing time can be considerably contracted. As not only the central electrode, the matching circuit, but also the external connecting terminal is also integrated into the dielectric basic plate 200, the number of the parts can be reduced as compared with the conventional circulator and the size can be made smaller. As the ferrite plate 6 can be accommodated in the concave portion 200*b* formed on the reverse face of the dielectric basic plate 200 in the circulator in the present embodiment, the magnetic yoke 72 comes into direct contact with the earth pattern 426 (see FIG. 49) formed on the reverse face of the dielectric basic plate 200. Therefore, in the conventional circulator, the earth plate 8 (for example, see FIG. 57) which was required can be made unnecessary, the number of the components can be further reduced, and the size can be made much smaller. In the present embodiment, a problem can not be caused in terms of strength even if the respective ceramic green sheets are made much thinner, because a plurality of ceramic green sheets can be integrated into one dielectric basic plate 200 by co-firing. As a result, the interval among the respective central electrode portions 216 through 218 can be made much narrower, and the electric symmetrical property of the respective central electrode portions 216 through 218 can be improved.

Blank portions 407*a*, 409*a*, 411*a*, 413*a*, 415*a*, 417*a*, 418*a*, 419*a*, 421*a*, 422*a*, 423*a*, 424*a*, 425*a*, 426*a* are formed, so as to surround the periphery of the external connecting terminal Ta, on the earth electrode pattern or the earth electrode portion in the given ceramic green sheet. Blank portions 407*b*, 409*b*, 411*b*, 413*b*, 415*b*, 416*b*, 418*b*, 419*b*, 421*b*, 422*b*, 423*b*, 424*b*, 425*b*, 426*b* are formed so as to surround the periphery of the external connecting terminal Tb, blank portions 407*c*, 409*c*, 411*c*, 413*c*, 415*c*, 416*c*, 417*c*, 419*c*, 421*c*, 422*c*, 423*c*, 424*c*, 425*c*, 426*c* are formed so as to surround the periphery of the external connecting terminal TC. These blank portions prevents short-circuiting between the external connecting terminals Ta through Tc which become input, output terminals, and the respective earth electrode films of pattern shapes and the respective earth electrode portions. As the external connecting terminals Td through Tf are earth terminals, such blank portions as described hereinabove are not provided on these peripheries.

The circulator in the present embodiment constructed as described hereinabove is placed on the external circuit basic plate (not shown), and the external connecting terminals Ta through Tf are soldered directly with the connecting terminal on the circuit basic plate side. Accordingly, the circulator in the present embodiment can be mounted on the surface onto the external circuit basic plate, thus making it unnecessary to have the troublesome wiring operation.

The operation of the circulator shown in FIG. 21 and FIG. 22 will be described. When the high frequency signal is inputted into the external connecting terminal Ta, the high frequency magnetic field caused round the central electrode portion 216 is rotated by the given angle by the direct current magnetic field from the magnet 9 so as to cause the induced electric current in, for example, the right-hand adjacent central electrode portion 217 by the inductive coupling through the ferrite plate 6. The high frequency signal inputted from the external connecting terminal Ta is transmitted to the right-hand adjacent external connecting terminal Tb, but is not transmitted to the left-hand adjacent external connecting terminal Tc. Similarly, the high frequency signal inputted from the external connecting terminal Tb is transmitted to the right-hand adjacent external connecting terminal Tc, but is not transmitted to the left-hand adjacent external connecting terminal Ta. The high frequency signal inputted from the external connecting terminal Tc is transmitted to the right-hand adjacent external connecting terminal Ta, but is not transmitted to the left-hand adjacent external connecting terminal Tb.

The circulator shown in FIG. 21 and FIG. 22 can be used as an isolator if the terminal resistor is connected between any one of the wiring portions or the external connecting terminal (for example, the wiring portion 818 or the external connecting terminal Tc). In this case, the isolator transmits the high frequency signal only in one direction to one of the remaining external connecting terminals (for example, external connecting terminal Tb) from the other remaining external connecting terminal (for example, external connecting terminal Ta).

Although the connection among the respective capacity electrode films of pattern shapes and the respective capacity electrode portions, and the connections among the respective earth electrode films of pattern shapes and the respective earth electrode portions are adapted to be effected with the use of the through holes in the embodiments shown in FIG. 21 through FIG. 55, these connections may also be effected with the use of the side face electrodes.

As is clear from the forgoing description, according to the inventions in the above described embodiments, a plurality of electrode films of pattern shapes and a plurality of external connecting terminals for constructing the central electrodes and the matching circuits are fired simultaneously with a plurality of dielectric green sheets adhered under pressure in lamination and are integrated with one dielectric basic plate, so that smaller size, lower cost, higher reliability of the elements and the simplification of the assembling steps can be designed. As not only the central electrodes and the matching circuits, but also the external connecting terminal are integrated into one dielectric basic plate, the number of the components can be considerably reduced, and the size of the elements can be made smaller. As the number of the assembling steps becomes less by the reduction in the number of the components, the cost can be reduced. The connecting locations where soldering is required are reduced considerably, so the reliability is improved. As the internal circuits which were disposed conventionally in a plane can be arranged in a stack within the dielectric basic plate, the circuit area of the whole element can be reduced. As the respective electrode films of pattern shapes can be crossed without mutual contact within the dielectric basic plate, the insertion loss can be reduced without the requirement of making the width of the central electrode narrower as in the first prior art example. As the construction is integral, sufficiently larger strength can be retained even if the arrangement is made with the intervals among the respective electrode films of pattern shapes extremely close. As a result, the electric symmetrical property among the respective central electrodes can be maintained in better condition. As the dielectric basic plate, the respective electrode films of pattern shapes, and the respective external connecting terminals are formed at the same time in one co-firing step, the manufacturing time can be considerably shortened.

According to the invention of the above described embodiment, a more compact non-reciprocal circuit element is provided by the formation of a first concave portion for engaging a magnet for applying a direct current magnetic field on one main surface of the dielectric basic plate.

According to the invention in the above described embodiment, a second concave portion for engagement of the inductive coupling ferrite plate of the internal circuit is formed on the other main surface of the dielectric basic plate so that a non-reciprocal circuit element which is more compact and lower in price can be obtained. As the magnetic yoke can be used as an earth plate used with the conventional non-reciprocal circuit element, the number of the parts is reduced, and a non-reciprocal circuit element which is much smaller in size and lower in price can be obtained.

(Fourth Embodiment)

Figure 62:
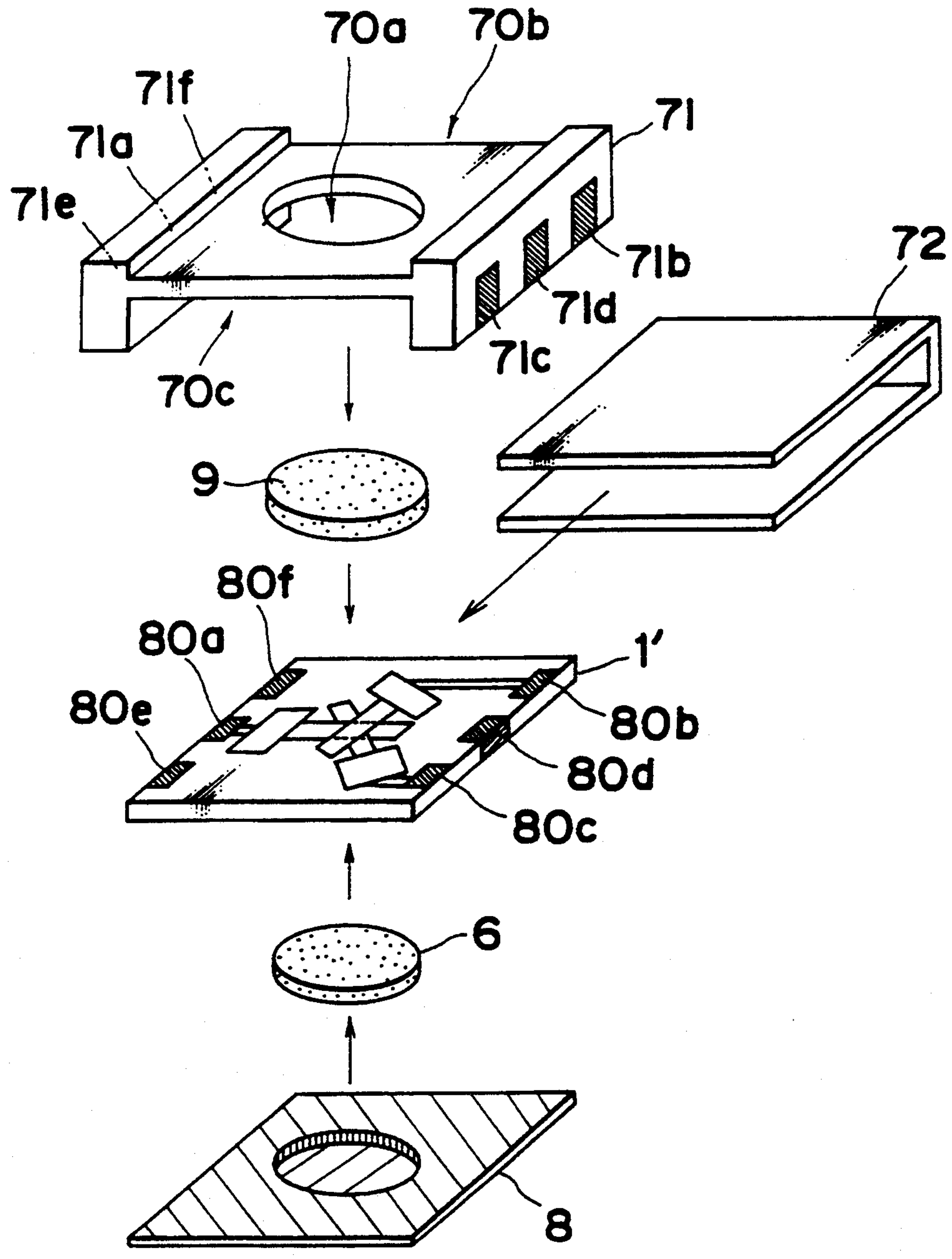
FIG. 62 is an exploded perspective view of the essential portions seen from the top side of a circulator in accordance with a fourth embodiment of the invention.
Figure 63:
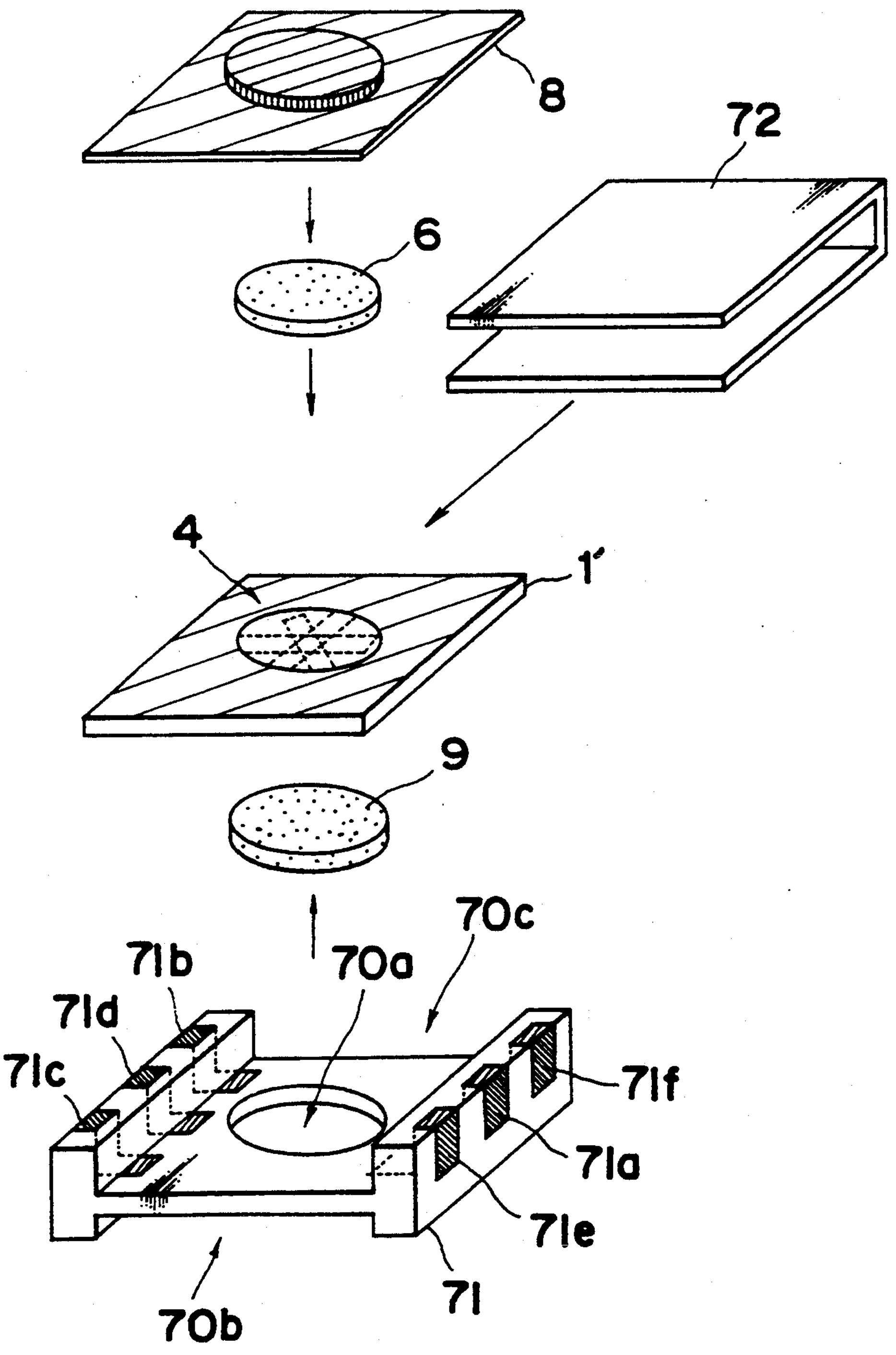
FIG. 63 is an exploded perspective view seen from the reverse side of a circulator in accordance with the fourth embodiment.
Figure 64:
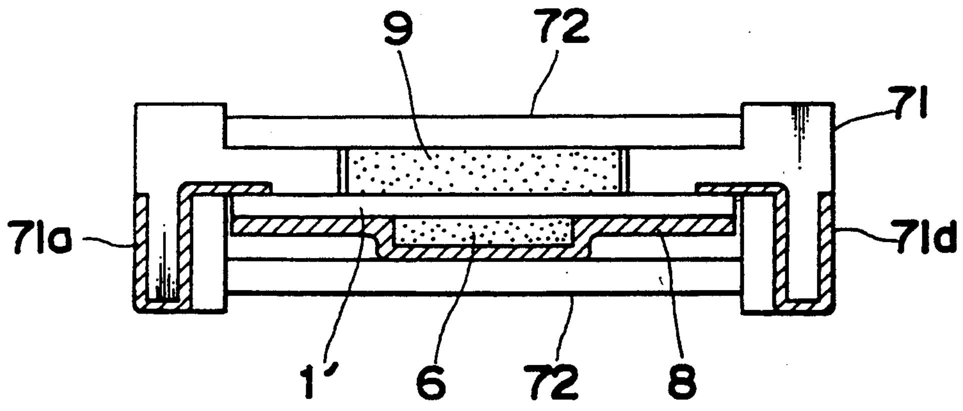
FIG. 64 is a sectional view of a circulator in accordance with the fourth embodiment.

FIG. 62 through FIG. 64 are views showing the construction of a fourth embodiment of the invention. FIG. 62 is an exploded perspective view seen from the top side thereof. FIG. 63 is an exploded perspective view seen from below. FIG. 64 is a sectional view thereof. Referring now to FIG. 62 through FIG. 64, a central electrode, a matching capacitor and so on are formed on the dielectric basic plate 1'. Input, output terminals **80*a*, 80*b*, 80*c* formed on the surface of the dielectric basic plate 1' are connected with one electrode of each matching capacitor. The earth terminals 80*d*, 80*e*, 80*f* are connected with the earth electrode 4 formed on the reverse face of the dielectric basic plate 1'. A case 71 composed of resin moldings has an approximately "H" sectional shape with a through hole 70*a* for inserting a magnet 9 being formed in the central portion thereof. A dielectric basic plate 1' is disposed in the lower side concave portion 70*c* of the case 71. A ferrite plate 6 and an earth plate 8 are disposed further under the dielectric basic plate. A metallic magnetic yoke 72 is engaged into the upper, lower concave portions 70*b*, 70*c* of the case 71 so as to enclose magnet 9, dielectric basic plate 1', ferrite plate 6 and earth plate 8. Thereafter, the magnetic yoke 72 is fixed to the case 71. External connecting terminals 71*b*, 71*c*, 71*d* are formed on one side face of the case 71, and external connecting terminals 71*a*, 71*e*, 71*f* are formed on the other side face. The respective external connecting terminals 71*a* through 71*f* go round onto the reverse face of the case 71 as shown in FIG. 63 and FIG. 64, and thereafter, extend through the interior of the case 71 and are exposed onto the ceiling face of the lower side concave portion 70*c* of the case 71. The input, output terminals 80*a*, 80*b*, 80*c* respectively come into contact against the external connecting terminals 71*a*, 71*b*, 71*c*. The earth terminals 80*d*, 80*e*, 80*f* respectively come into contact against the external connecting terminals 71*d*, 71*e*, 71*f***.

According to the construction of the above described fourth embodiment, the circulator can be mounted on an external circuit basic plate without a bothersome wiring operation. Namely, the respective external connecting terminals **71*a* through 71*f*** have only to be soldered onto the circuit basic plate with the case 71 being placed on the external circuit basic plate. The fourth embodiment is capable of surface mounting onto the circuit basic plate in this manner.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as included therein.

What is claimed is:

1. A non-reciprocal circuit element having substantially less attenuation of signals in a transmission direction, than in a direction opposite to said transmission direction, comprising:

a plurality of electrode films having respective pattern shapes which are provided on a dielectric material within an integral dielectric substrate, the electrode films being arranged within the dielectric substrate and coacting so as to constitute said circuit element.

2. A non-reciprocal circuit element in accordance with claim 1, wherein the electrode films include at least one central electrode pattern, at least one capacitor electrode pattern, and at least one earth electrode pattern, and in the interior of the dielectric, the at least one capacitor electrode pattern and the at least one earth electrode pattern are alternately disposed with dielectric material between them, and the respective capacitor electrode patterns are connected in common and connected with the corresponding central electrode patterns, and the respective earth electrode patterns are connected in common, so as to provide at least one matching circuit capacitance among the central electrode patterns and the earth electrode patterns.

3. A non-reciprocal circuit element having substantially less attenuation of signals in a transmission direction, than in a direction opposite to said transmission direction, comprising an integral dielectric base plate formed of a plurality of cofired pressure-laminated dielectric green sheets, a plurality of electrode films having respective pattern shapes sintered with the dielectric green sheets and disposed within the dielectric base plate, a plurality of external connecting terminals connected with the electrode films and exposed on the outer periphery of the dielectric base plate, so that the internal circuits and the external connecting terminals are integral with the dielectric base plate and the electrode films coact so as to constitute said circuit element.

4. A non-reciprocal circuit element in accordance with claim 3, wherein the dielectric base plate has first and second main surfaces, a first concave portion for engaging a magnet for applying a direct current magnetic field to said electrode films being formed on the first main surface.

5. A non-reciprocal circuit element in accordance with claim 3, wherein the dielectric base plate has a first main surface and a second main surface, a concave portion for engaging a ferrite plate for inductive coupling of the electrode films being formed on the second main surface.

6. A non-reciprocal circuit element in accordance with claim 4, wherein a concave portion for engaging a ferrite plate for inductive coupling of the electrode film is formed on the second main surface.

* * * * *